US010994764B2

(12) United States Patent
Yang

(10) Patent No.: US 10,994,764 B2
(45) Date of Patent: May 4, 2021

(54) FOLDABLE CART FRAME

(71) Applicant: B & B Best Industrial Co., Ltd., Taipei (TW)

(72) Inventor: Cheng-Fan Yang, Tainan (TW)

(73) Assignee: B & B Best Industrial Co., Ltd., Taipei (TW)

( * ) Notice: Subject to any disclaimer, the term of this patent is extended or adjusted under 35 U.S.C. 154(b) by 0 days.

(21) Appl. No.: 16/567,024

(22) Filed: Sep. 11, 2019

(65) Prior Publication Data
US 2020/0086906 A1    Mar. 19, 2020

(30) Foreign Application Priority Data

Sep. 18, 2018    (CN) .......................... 201811088991.8
Mar. 29, 2019    (CN) .......................... 201920428047.6

(51) Int. Cl.
     *B62B 9/00*      (2006.01)
     *B62B 7/14*      (2006.01)
     *B62B 7/06*      (2006.01)
     *B62B 9/12*      (2006.01)

(52) U.S. Cl.
CPC .............. *B62B 7/145* (2013.01); *B62B 7/062* (2013.01); *B62B 7/142* (2013.01); *B62B 9/12* (2013.01)

(58) Field of Classification Search
CPC ......... B62B 7/145; B62B 7/062; B62B 7/142; B62B 9/12
USPC ....................................................... 280/642
See application file for complete search history.

(56) References Cited

U.S. PATENT DOCUMENTS

| | | | |
|---|---|---|---|
| 8,403,355 B2* | 3/2013 | Liao | B62B 3/12 280/651 |
| 9,079,598 B1* | 7/2015 | Oreyang | B62B 3/022 |
| 9,988,064 B2* | 6/2018 | Liao | B62B 9/20 |
| 2002/0093177 A1* | 7/2002 | Chen | B62B 7/145 280/647 |
| 2003/0061533 A1* | 3/2003 | Perloff | H04L 45/245 714/4.3 |
| 2007/0290485 A1* | 12/2007 | Nolan | B60B 33/0002 280/642 |
| 2011/0012324 A1* | 1/2011 | Yeh | B62B 9/102 280/642 |
| 2013/0062865 A1* | 3/2013 | Liao | B62B 3/02 280/651 |

* cited by examiner

*Primary Examiner* — Hau V Phan
(74) *Attorney, Agent, or Firm* — Alan D. Kamrath; Karin L. Williams; Mayer & Williams PC

(57) ABSTRACT

A foldable cart frame has a folding mechanism, a connecting seat, two rear legs, and a handle unit. The folding mechanism has a base seat, at least one guiding rod connected to the base seat, a sliding seat slidably disposed on the at least one guiding rod, and a linkage assembly moveably connected to the sliding seat. The connecting seat is movably disposed on the folding mechanism. The two rear legs are disposed on the base seat. The handle unit is moveably inserted through the base seat, is fixedly connected to the sliding seat, and can drive the sliding seat and the connecting seat to move. The two rear legs are driven by the linkage assembly. The foldable cart frame can be folded and expanded conveniently and quickly. The connecting seat and its connecting components can form a stable supporting structure after expanding.

20 Claims, 16 Drawing Sheets

FOLDABLE CART FRAME

This application claims the benefit of China patent application No. 201811088991.8, filed on Sep. 18, 2018 and China patent application No. 201920428047.6, filed on Mar. 29, 2019.

BACKGROUND OF THE INVENTION

1. Field of the Invention

The present invention relates to a foldable cart frame, and more particularly to a foldable cart frame that is adapted to carts such as strollers and shopping carts, and can be folded and expanded.

2. Description of Related Art

Carts such as strollers and shopping carts are all lightweight for ease in carrying out and use, minimization, conveying, and storage. Furthermore, the carts can use foldable mechanisms for folding and expanding.

Taking the stroller as an example. A lightweight stroller with a folding function has a stroller frame. The stroller frame has a retractable handle pushing rod, two rear legs, a first locking device, and a second locking device. A bottom end of the retractable handle pushing rod is connected to a front wheel. The two rear legs are pivotally disposed on the retractable handle pushing rod. A bottom end of each one of the two rear legs is connected to a rear wheel. The first locking device is disposed between the retractable handle pushing rod and top ends of the two rear legs for limiting a relative rotation between the two rear legs and the retractable handle pushing rod. The second locking device is disposed between the retractable handle pushing rod and a rotatable child seat connected to the retractable handle pushing rod. A relative rotation between the rotatable child seat and the retractable handle pushing rod is limited by the second locking device.

In folding, the first locking device and the second locking device are respectively unlocked by a user, and then the stroller frame is folded by the user. In expanding, folding mechanisms of the stroller frame are pulled respectively. The folding mechanisms are locked by the first locking device and the second locking device for ensuring that the stroller frame is completely expanded and fixed.

The cart as described uses the folding mechanisms for having functions of expanding and folding. When the cart is not in use, the cart can be folded into a small volume by the user for ease in carrying out, use, conveying, and storage. However, the cart has many folding mechanisms that are not completely linked with each other. The folding operation and the expanding operation of the cart are inconvenient.

To overcome the shortcomings, the present invention tends to provide a foldable cart frame to mitigate or obviate the aforementioned problems.

SUMMARY OF THE INVENTION

The main objective of the invention is to provide a foldable cart frame that may solve the problems that the folding mechanisms are not linked, and the folding operation and the expanding operation of the cart are inconvenient.

The foldable cart frame has a folding mechanism, a connecting seat, two rear legs, and a handle unit.

The folding mechanism has a base seat, at least one guiding rod, a sliding seat, a front supporting member, and a linkage assembly. The base seat has a base portion having two sides, two rear connecting portions, and a locking element. The two rear connecting portions are respectively connected to and located at the two sides of the base portion. The locking element is disposed on the base portion. The at least one guiding rod is connected to the base portion of the base seat and is inclined forwardly and downwardly. The at least one guiding rod is used to connect at least one front wheel. The sliding seat is disposed around the at least one guiding rod and moves along the at least one guiding rod. The front supporting member is pivotally disposed on the sliding seat. The linkage assembly is moveably connected to the sliding seat.

The connecting seat is moveably disposed on the folding mechanism, and has a body and a rear supporting member. The body is disposed on the front supporting member, and has a rear end and a front section. The front section of the body is pivotally disposed on the front supporting member. The rear supporting member is disposed on the rear end of the body, is inclined downwardly, and has a bottom end pivotally disposed on the base seat.

The two rear legs are disposed on the base seat, are connected to the linkage assembly, and have two top ends pivotally disposed on the two rear connecting portions of the base seat. The two rear legs are respectively connected to two rear wheels and are linked between the sliding seat and the linkage assembly for folding forwardly and expanding backwardly.

The handle unit is moveably inserted through the base portion of the base seat, is parallel with the at least one guiding rod, and is fixedly connected to the sliding seat. The sliding seat and the connecting seat are driven by the handle unit for moving. The locking element is able to lock the handle unit in the base seat.

The foldable cart frame has a linkage mechanism composed of the folding mechanism, the connecting seat, the two rear legs, and the handle unit. The base seat is connected to the at least one guiding rod. The sliding seat is moveably disposed around the at least one guiding rod. The two rear legs are respectively and pivotally disposed on the two rear connecting portions of the base seat. The sliding seat is connected to the two rear legs by the linkage assembly. The front supporting member is pivotally disposed on the sliding seat and is pivotally connected to a front end of the connecting seat. A rear end of the connecting seat is pivotally connected to the base seat by the rear supporting member. The handle unit drives the sliding seat and the connecting seat to move and drives the two rear legs by the linkage assembly for folding and expanding the foldable cart frame conveniently and quickly. After the foldable cart frame is expanded, the connecting seat can form a stable supporting structure.

Furthermore, the foldable cart frame has a pivoting connecting structure located between the base seat and the two rear legs. In folding, the two rear legs are folded toward and are relatively close to each other. Simultaneously, the two rear wheels connected to the bottom ends of the two rear legs can be located between the two front wheels located at a front end of the foldable cart frame, or the two front wheels can be located between the two rear wheels. After folding, the foldable cart frame can be folded into a small volume for carry, use, convey, and store conveniently.

The foldable cart frame has a switch assembly disposed on the base seat for locking the two rear legs. Before folding, the locking state of the switch assembly has to be released. The safety in use of the foldable cart frame is increased.

Other objects, advantages and novel features of the invention will become more apparent from the following detailed description when taken in conjunction with the accompanying drawings.

DETAILED DESCRIPTION OF PREFERRED EMBODIMENT

Figure 1:
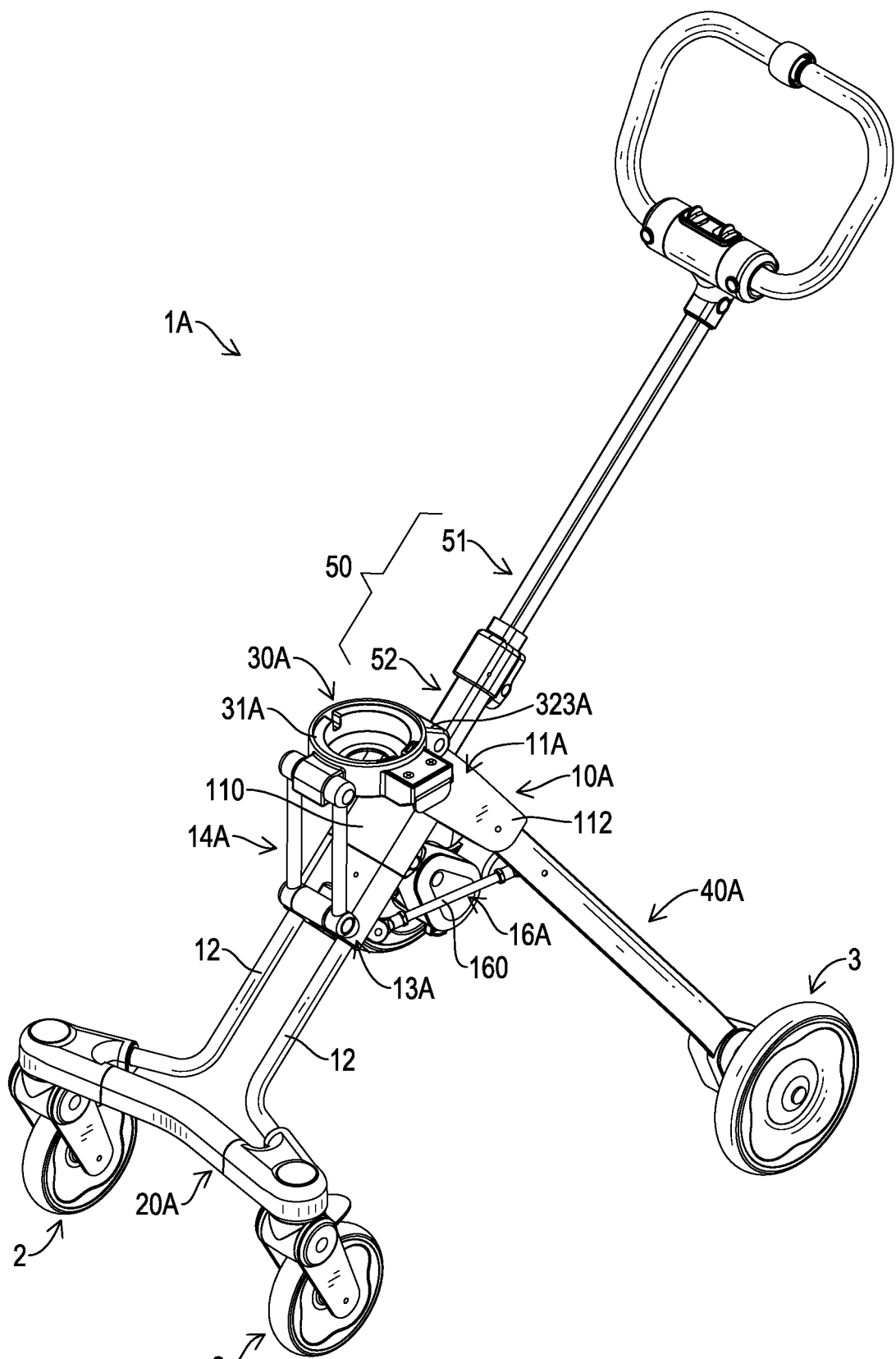
FIG. 1 is a perspective view of a first embodiment of a foldable cart frame in accordance with the present invention.
Figure 2:
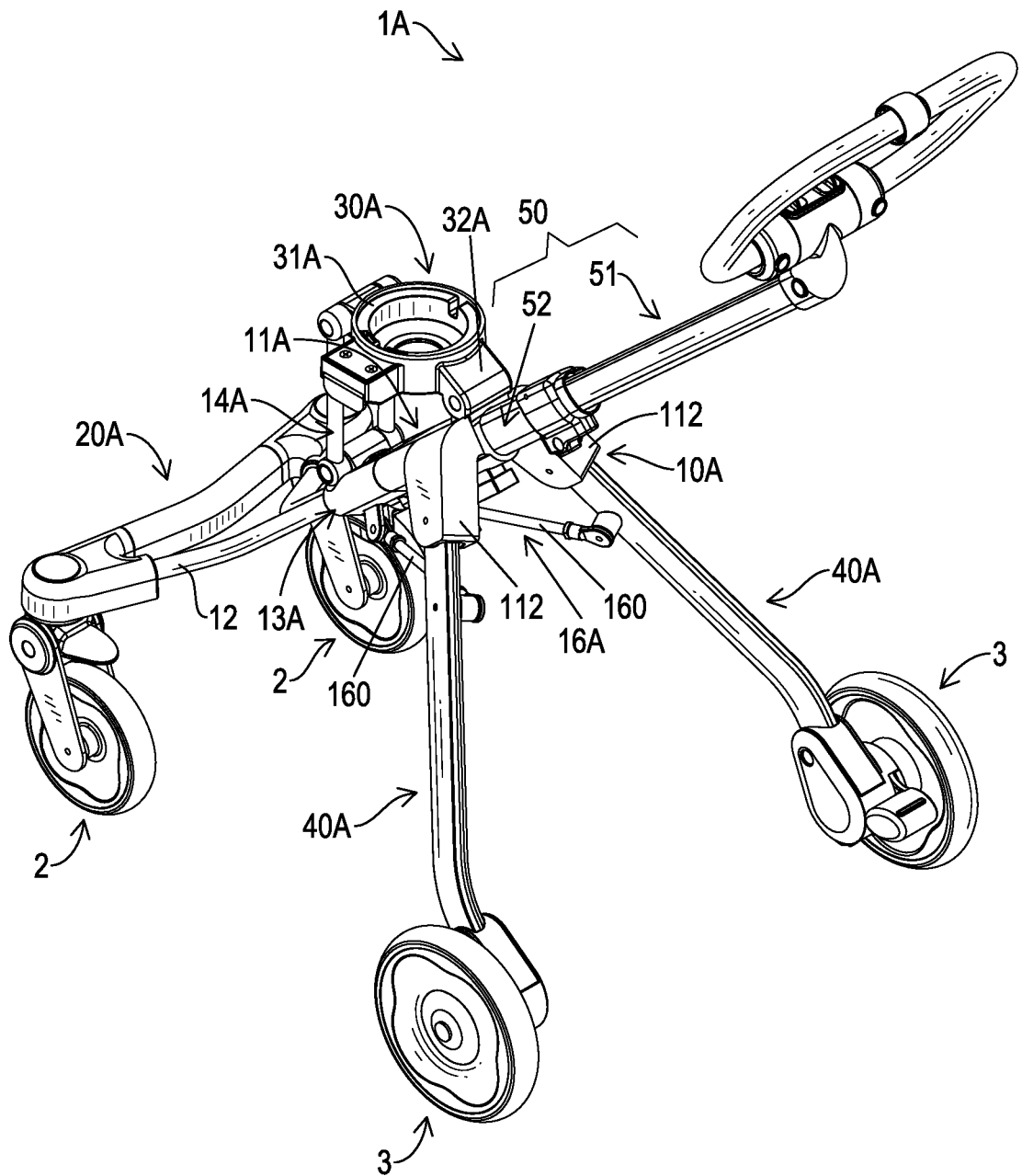
FIG. 2 is another perspective view of the foldable cart frame in FIG. 1.
Figure 3:
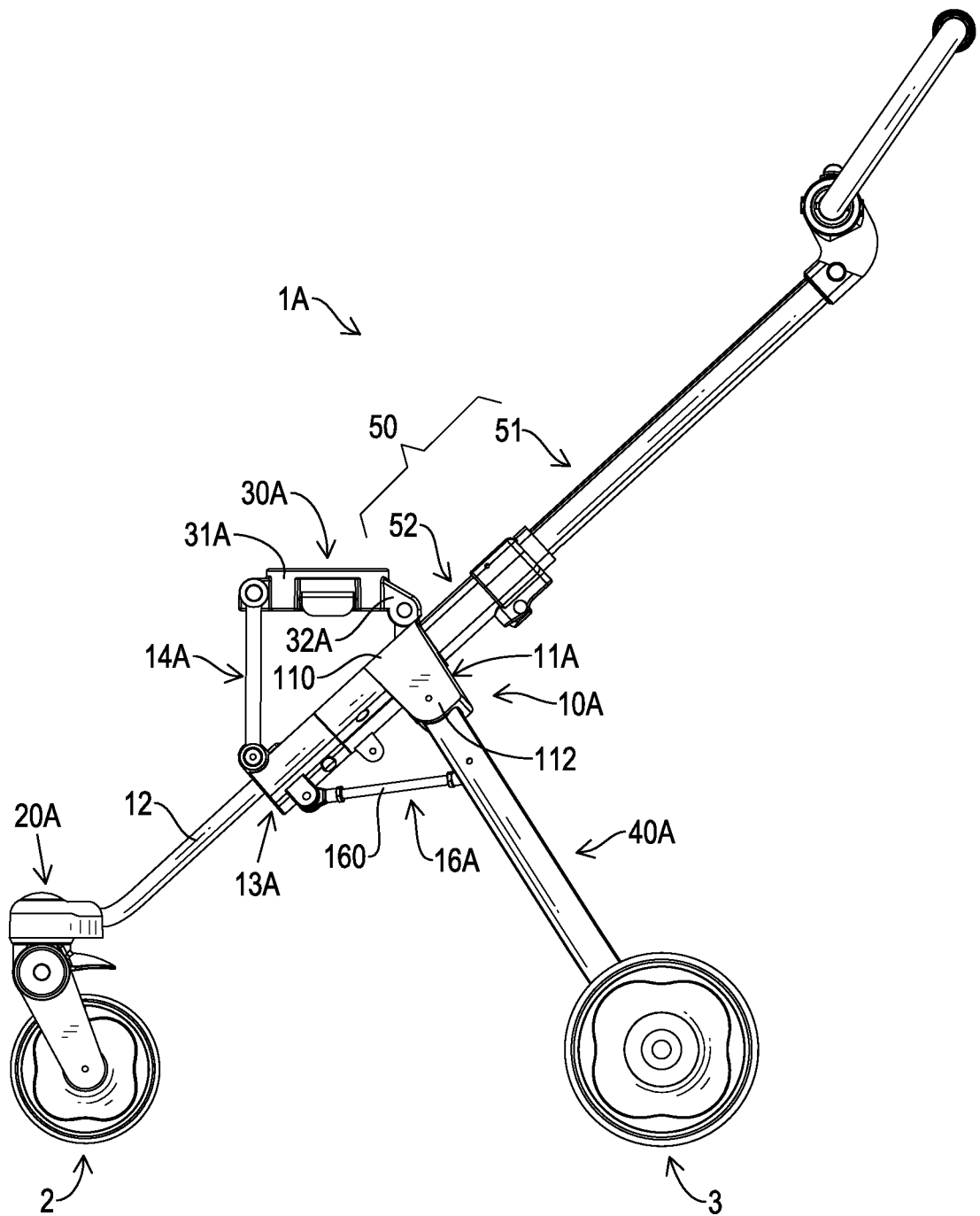
FIG. 3 is a side view of the foldable cart frame in FIGS. 1 and 2.
Figure 4:
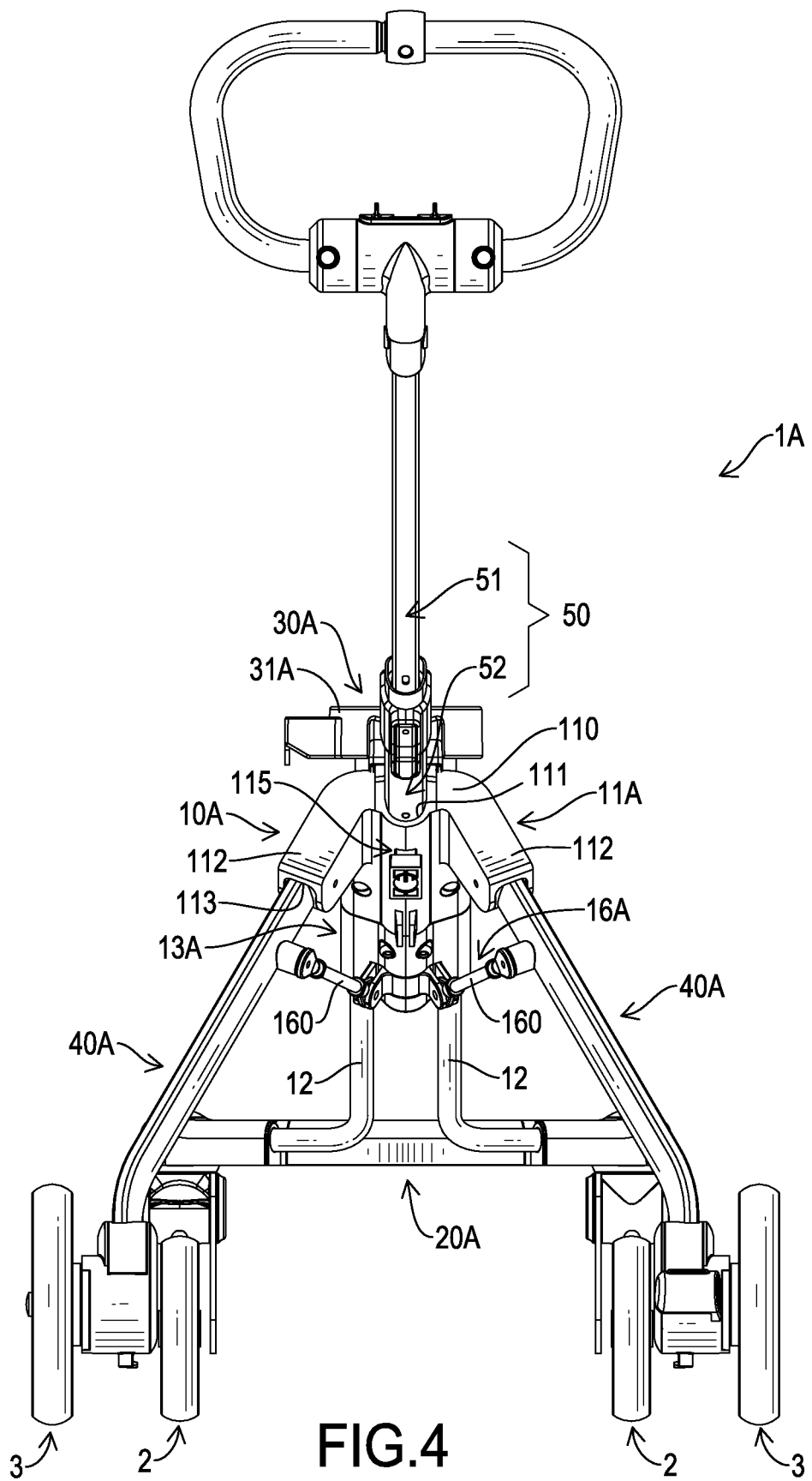
FIG. 4 is a rear side view of the foldable cart frame in FIGS. 1 and 2.
Figure 7:
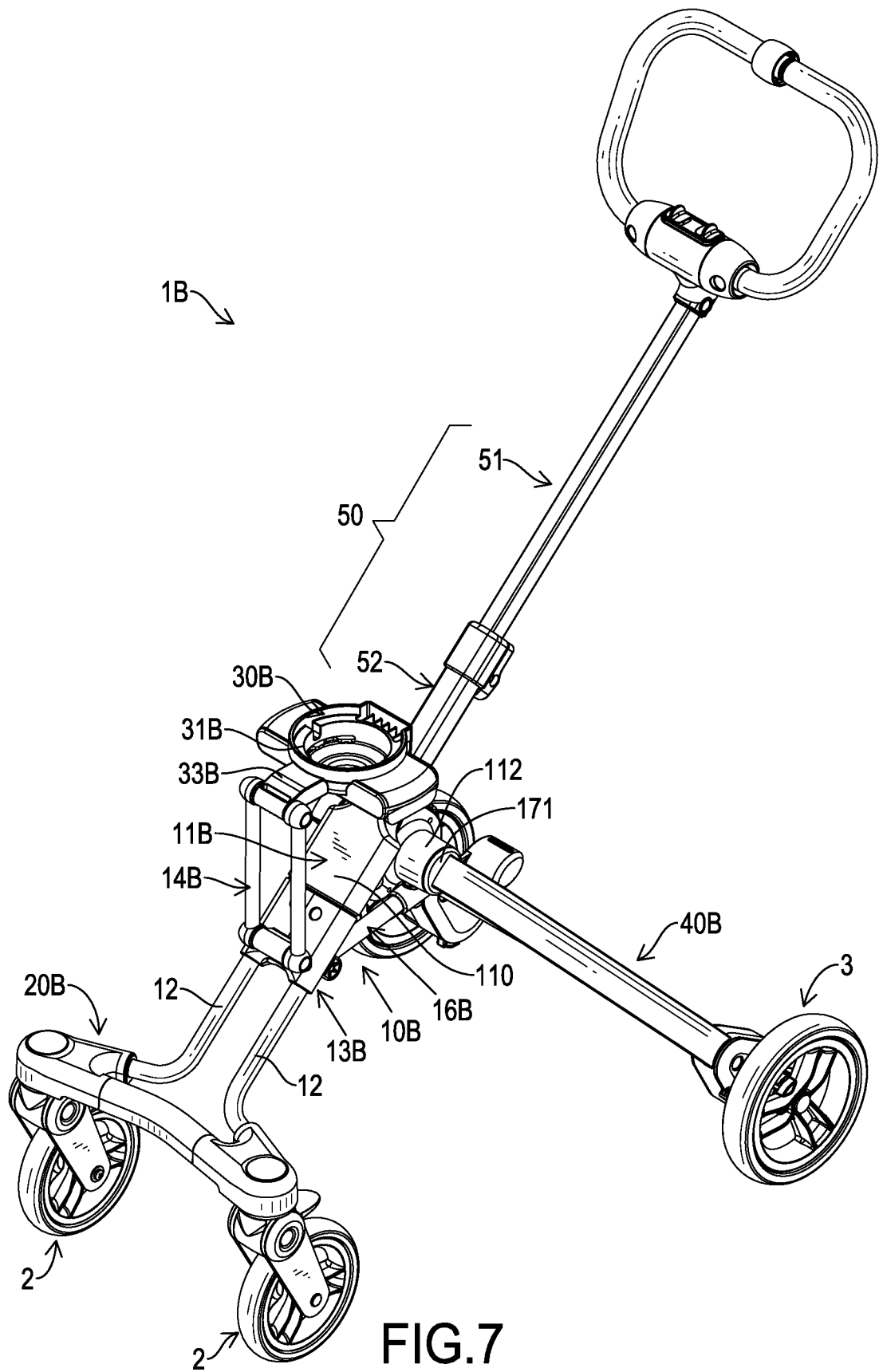
FIG. 7 is a perspective view of a second embodiment of a foldable cart frame in accordance with the present invention.

With reference to FIGS. 1 and 7, a first embodiment and a second embodiment of a foldable cart frame 1A, 1B in accordance with the present invention each comprise a folding mechanism 10A, 10B, a connecting seat 30A, 30B, two rear legs 40A, 40B, and a handle unit 50. The connecting seat 30A, 30B, the two rear legs 40A, 40B, and the handle unit 50 are connected to the folding mechanism 10A, 10B for linkage. The foldable cart frame 1A, 1B can be folded and expanded by the folding mechanism 10A, 10B.

With reference to FIGS. 1 to 4, in the first embodiment of the foldable cart frame 1A, the foldable cart frame 1A has the folding mechanism 10A, the connecting seat 30A, the two rear legs 40A, and the handle unit 50.

With reference to FIGS. 1 to 4, the folding mechanism 10A has a base seat 11A, at least one guiding rod 12, a sliding seat 13A, a front supporting member 14A, and a linkage assembly 16A. The base seat 11A has a base portion 110 having two sides and two rear connecting portions 112. The two rear connecting portions 112 are respectively connected to and are located at the two sides of the base portion 110. The base seat 11A has a guiding hole 111 formed on the base seat 11A. Each one of the two rear connecting portions 112 has a guiding connecting groove 113A. The guiding connecting groove 113A has an opening formed on the rear connecting portion 112 and is inclined forwardly and downwardly. The base seat 11A further has a locking element 115. The locking element 115 is disposed on a back of the base portion 110, is inserted into the guiding hole 111 of the base seat 11A, and is selected from a locking element that has a spring and a lock pin.

With reference to FIGS. 1 to 4, the at least one guiding rod 12 is connected to the base portion 110 of the base seat 11A and is inclined forwardly and downwardly. A front end of each one of the at least one guiding rod 12 is directly or indirectly connected to at least one front wheel 2. A rear end of each one of the at least one guiding rod 12 is located above the front end of each one of the at least one guiding rod 12 and is connected to the base portion 110 of the base seat 11A. Furthermore, the folding mechanism 10A has two guiding rods 12. The two guiding rods 12 are respectively located at two sides of the guiding hole 111 of the base seat 11A, are parallel with each other, and are both connected to the base seat 11A. Front ends of the two guiding rods 12 are co-connected to a front wheel seat 20A of the foldable cart frame 1A. The front wheel seat 20A is connected to two front wheels 2 having functions of rotation and steering.

With reference to FIGS. 1 to 4, the sliding seat 13A is disposed around the at least one guiding rod 12 and moves along the at least one guiding rod 12 upwardly and downwardly.

With reference to FIGS. 1 to 4, the front supporting member 14A is pivotally disposed on the sliding seat 13A. A bottom end of the front supporting member 14A is pivotally disposed on a front-top portion of the sliding seat 13A.

With reference to FIGS. 1 to 4, the linkage assembly 16A is pivotally connected to the sliding seat 13A. The linkage assembly 16A has two linking rods 160. Each one of the two linking rods 160 is connected with the sliding seat 13A and a corresponding one of the two rear legs 40A. One end of each one of the two linking rods 160 is pivotally disposed on a back surface of the sliding seat 13A. The other end of each one of the two linking rods 160 is pivotally disposed on the corresponding one of the two rear legs 40A.

With reference to FIGS. 1 to 4, the connecting seat 30A is moveably disposed on the folding mechanism 10A, can be oscillated forwardly and backwardly, and has a body 31A and a rear supporting member 32A. The body 31A is disposed on the front supporting member 14A, and has a rear end and a front section. The front section of the body 31A is pivotally disposed on the front supporting member 14A. The rear supporting member 32A is disposed on the rear end of the body 31A, is inclined downwardly, and has a bottom end pivotally disposed on the base portion 110 of the base seat 11A. The connecting seat 30A can be supported and folded by the front supporting member 14A and the rear supporting member 32A. A length of the front supporting member 14A is longer than a length of the rear supporting member 32A. A top end of the front supporting member 14A and a top end of the rear supporting member 32A are located at the same or approximately the same level. The connecting seat 30A is substantially disposed in a horizontal state.

With reference to FIGS. 1 to 4, the two rear legs 40A are disposed on the base seat 11A, are connected to the linkage assembly 16A, and have two top ends pivotally disposed on the two rear connecting portions 112 of the base seat 11A. The two rear legs 40A are connected to two rear wheels 3. The two rear legs 40A are linked between the sliding seat 13A and the linkage assembly 16A for folding forwardly and expanding backwardly. The two rear legs 40A are limited by the two guiding connecting grooves 113 for oscillating and rotating in a limited range forwardly and backwardly. Top sections of the two rear legs 40A are respectively and pivotally connected to the two linking rods 160 of the linkage assembly 16A. The two rear legs 40A are guided by the two guiding connecting grooves 113. The two rear legs 40 are rotated forwardly. Simultaneously, the two rear legs 40 move inwardly and are close to each other.

With reference to FIGS. 1 to 4, the handle unit 50 is moveably inserted through the base portion 110 of the base seat 11A, is parallel with the at least one guiding rod 12, and is fixedly connected to the sliding seat 13A. A bottom end of the handle unit 50 is fixedly connected to the sliding seat 13A. The handle unit 50 can move upwardly and downwardly, and drives the sliding seat 13A. The handle unit 50 can be locked in the base seat 11A by the locking element 115 disposed on the base seat 11A.

With reference to FIGS. 1 to 4, the handle unit 50 may be a member with a fixed length or a telescopic member with an adjustable length. In the best mode, the handle unit 50 is the telescopic member with an adjustable length. The handle unit 50 has a movable rod 52 and a handle arm 51. The movable rod 52 is hollow, is slidably inserted through the base portion 110 of the base seat 11A, and has a bottom end fixedly connected to the sliding seat 13A. The handle arm 51 is inserted into the movable rod 52. A length of the handle unit 50 is adjustable by a relative movement between the handle arm 51 and the movable rod 52. The movable rod 52 and the handle arm 51 can be selectively locked by an elastic fastener or other fixing elements. The handle unit 50 is slidably inserted into the guiding hole 111 of the base portion 110 by the movable rod 52. The bottom end of the movable rod 52 is fixedly connected to the sliding seat 13A. The locking element 115 of the base seat 11A can be locked by the movable rod 52 of the handle unit 50 for stopping the movable rod 52 of the handle unit 50 from sliding relative to the base seat 11A. Simultaneously, the sliding seat 13A is fixed on the at least one guiding rod 12 by the locked movable rod 52.

With reference to FIGS. 1 to 4, the foldable cart frame 1A is not limited to children's carts or shopping carts. The at least one guiding rod 12 is directly connected to the at least one front wheel 2. Alternatively, the at least one guiding rod 12 is indirectly connected to the at least one front wheels 2 by the front wheel seat 20A. The two rear legs 40A are respectively connected to the two rear wheels 3. The connecting seat 30A can be connected to a child seat or a shopping basket.

In use, with reference to FIGS. 1 to 4, the foldable cart frame 1A is set in an expanding state. The base seat 11A is fixed on the at least one guiding rod 12. The movable rod 52 of the handle unit 50 is locked in the base seat 11A by the locking element 115 of the base seat 11A. The sliding seat 13A connected on the bottom end of the movable rod 52 is relatively fixed on the at least one guiding rod 12. The sliding seat 13A is fixed. A front end of the connecting seat 30A is connected to the fixed sliding seat 13A by the front supporting member 14A. A rear end of the connecting seat 30A is connected to the fixed base seat 11A by the rear supporting member 32A. The connecting seat 30A, the front supporting member 14A, and the rear supporting member 32A are restrained by each other for fixing.

The connecting seat 30A is connected with the rear supporting member 32A, the base seat 11A, the front supporting member 14A, the sliding seat 13A, and the guiding rod 12 to form a stable, substantially triangular supporting structure. A combined structure is combined with the sliding seat 13A, the at least one guiding rod 12, the base seat 11A, the two rear legs 40A, and the linkage assembly 16A to form the stable, substantially triangular supporting structure. The base seat 11A disposed on the at least one guiding rod 12 is connected to the two rear legs 40B. The front end of the linkage assembly 16A is limited by the locked sliding seat 13A. The two rear legs 40A are restrained and fixed by the linkage assembly 16A, thereby ensuring that the first embodiment of the foldable cart frame 1A has a stable structure and safety in expanding.

In expanding, with reference to FIGS. 1 to 4, the handle unit 50 is unlocked by the locking element 115 of the base seat 11A. The handle arm 51 of the handle unit 50 is pulled upwardly by a user. The movable rod 52 disposed around the handle arm 51 is slid relative to the base seat 11A. The sliding seat 13A driven by the movable rod 52 is slid upwardly along the at least one guiding rod 12. The front supporting member 14A located above the sliding seat 13B upwardly pushes the connecting seat 30A to move. The linkage assembly 16A backwardly pushes the two rear legs 40A. The two rear legs 40A are expanded backwardly. When the foldable cart frame 1A is expanded completely, the movable rod 52 is locked and fixed on the base seat 11A by the locking element 115.

Figure 5:
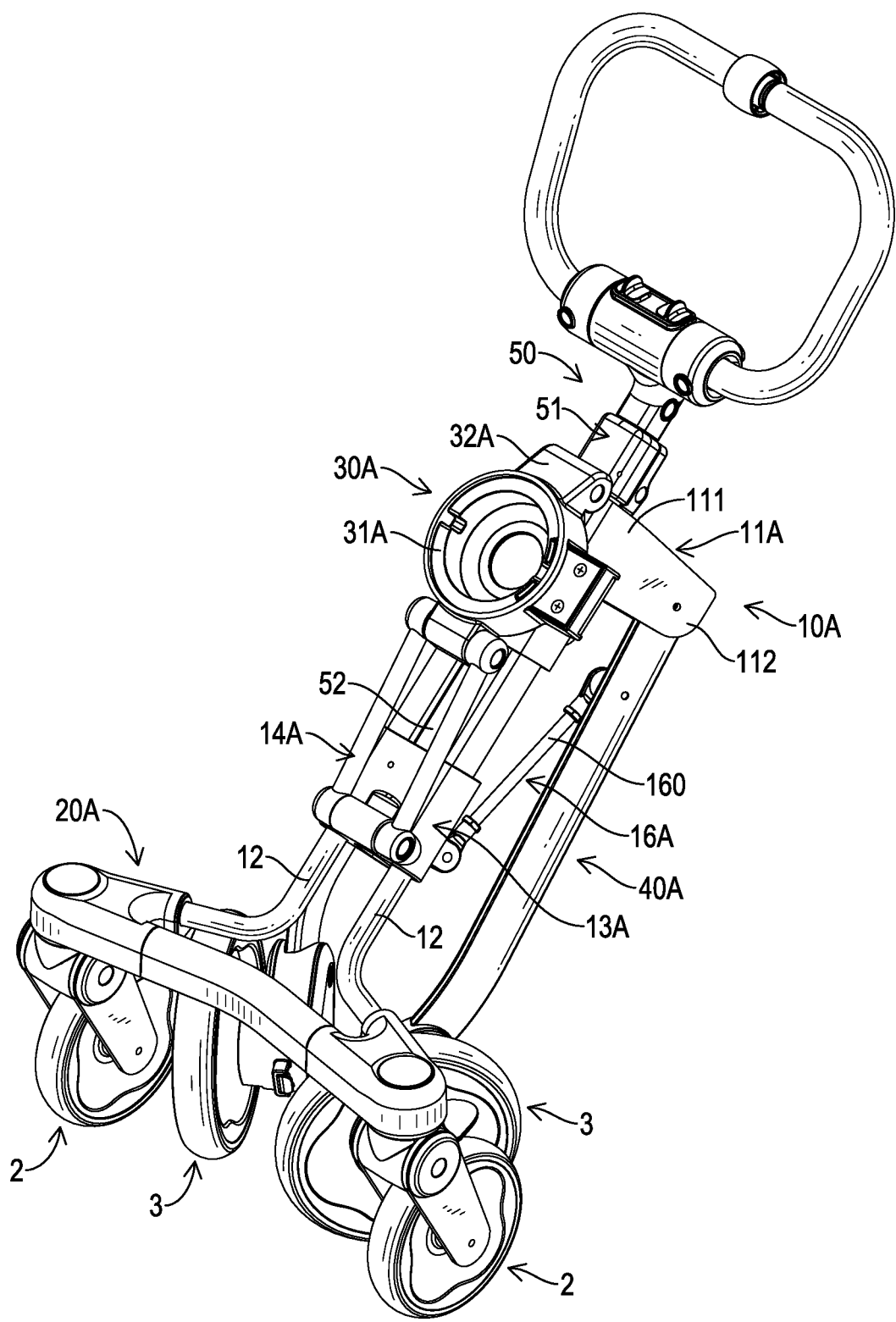
FIG. 5 is a folding perspective view of the foldable cart frame in FIGS. 1 and 2.
Figure 6:
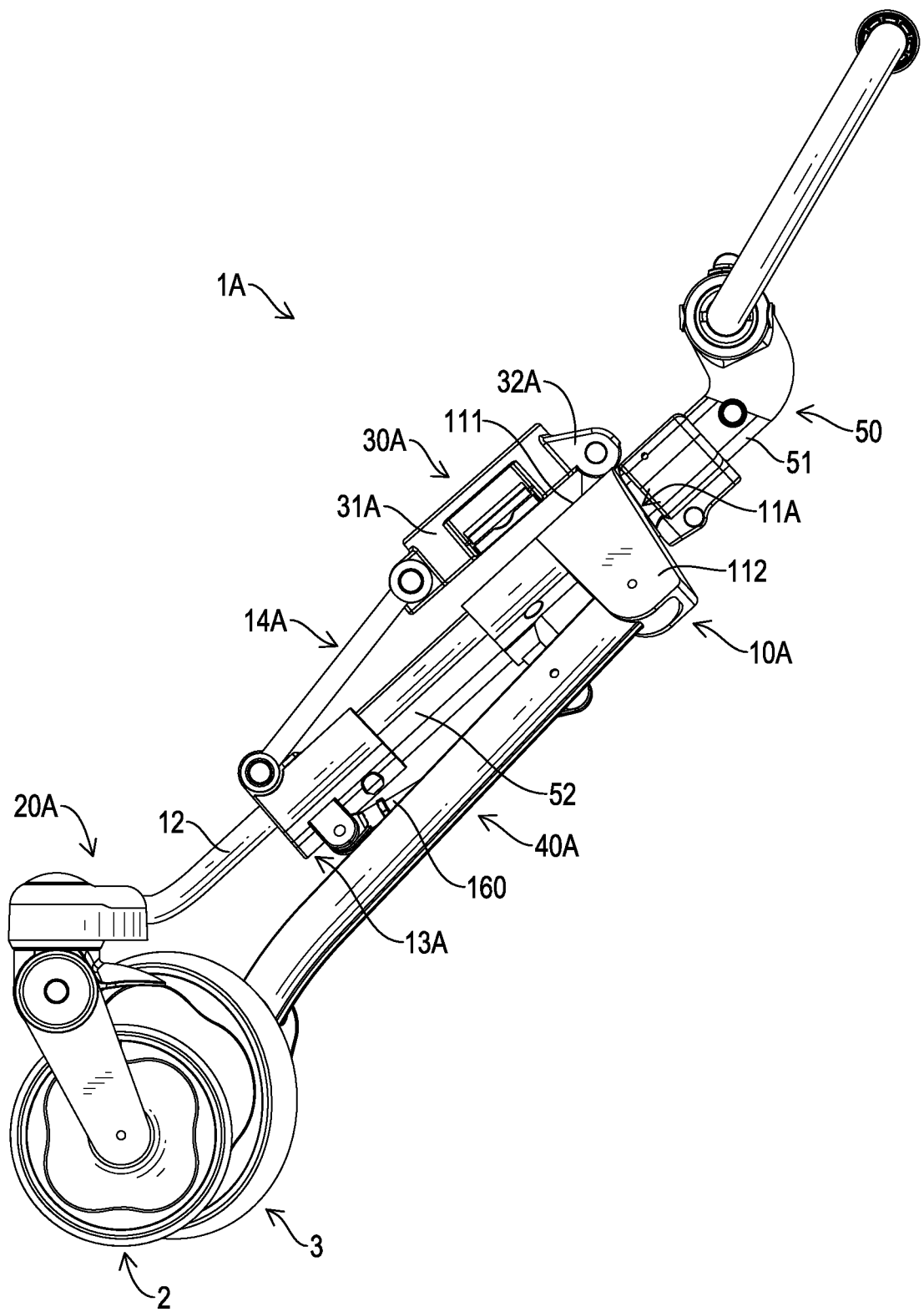
FIG. 6 is a folding side view of the foldable cart frame in FIGS. 1 and 2.

In folding, with reference to FIGS. 5 and 6, the movable rod 52 of the handle unit 50 is unlocked by the locking element 115 of the base seat 11A. The movable rod 52 driven by the handle arm 51 of the handle unit 50 is downwardly slid relative to the base seat 11A. The sliding seat 13A driven by the movable rod 52 is downwardly slid relative to the at least one guiding rod 12. The stable, substantially triangular supporting structure formed by the connecting seat 30A, the rear supporting member 32A, the base seat 11A, the front supporting member 14A, the sliding seat 13A, and the at least one guiding rod 12 is released and changes to a foldable linkage mechanism. The connecting seat 30A is folded by the foldable linkage mechanism to move toward the at least one guiding rod 12. Simultaneously, the stable, substantially triangular supporting structure formed by the sliding seat 13A, the at least one guiding rod 12, the base seat 11A, the two rear legs 40A, and the linkage assembly 16A is released and changes to the foldable linkage mechanism. The two rear legs 40A can be pulled by the sliding seat 13A to closely fold toward the at least one guiding rod 12 and the front wheel seat 20A. The foldable cart frame 1A has effects of convenient and quick folding.

After folding, the two rear wheels 3 can be folded between two inner sides of the two front wheels 2 for reducing the space occupied by the foldable cart frame 1A. The foldable cart frame 1A can be folded into a small volume for conveniences in carrying, use, conveying, and storage. When the foldable cart frame 1A is expanded, the two rear wheels 3 are located behind the two front wheels 2 for convenience in use.

With reference to FIGS. 7 to 9, and 11, in the second embodiment of the foldable cart frame 1B, the foldable cart frame 1B has the folding mechanism 10B, the connecting seat 30B, the two rear legs 40B, and the handle unit 50.

With reference to FIGS. 7 to 9, and 11, the folding mechanism 10B has the base seat 11B, the at least one guiding rod 12, the sliding seat 13B, the front supporting member 14B, and the linkage assembly 16B. The base seat 11B has a base portion 110 having two sides and two rear connecting portions 112. The two rear connecting portions 112 are respectively connected to and are located at the two sides of the base portion 110. The base seat 11B has a guiding hole 111 formed on the base seat 11B. The two rear connecting portions 112 have two connecting holes 1121. The base seat 11B has the locking element 115. The locking element 115 is disposed on the back of the base portion 110 and is used to lock the handle unit 50.

With reference to FIGS. 7 to 9, and 11, the at least one guiding rod 12 is connected to the base portion 110 of the base seat 11B and is inclined forwardly and downwardly. The front end of each one of the at least one guiding rod 12 is directly or indirectly connected to at least one front wheel 2. The rear end of each one of the at least one guiding rod 12 is connected to the base portion 110 of the base seat 11B. Furthermore, the folding mechanism 10B has the two guiding rods 12. The two guiding rods 12 are respectively located at the two sides of the guiding hole 111 of the base seat 11B, are parallel with each other, and are both connected to the base seat 11B. The front ends of the two guiding rods 12 are co-connected to the front wheel seat 20B of the foldable cart frame 1B, and are indirectly connected to the two front wheels 2 disposed at a spaced interval. The two front wheels 2 have functions of rotation and steering.

The sliding seat 13B is disposed around the at least one guiding rod 12 and moves along the at least one guiding rod 12 upwardly and downwardly below the base seat 11B. The front supporting member 14B is pivotally disposed on the sliding seat 13B. Furthermore, the front supporting member 14B is pivotally disposed on a front end of the sliding seat 13B.

The linkage assembly 16B is pivotally disposed on the sliding seat 13B and has a first linking rod 161 and a second linking rod 162. A front end of the first linking rod 161 is pivotally disposed on a back surface of the sliding seat 13B. A rear end of the first linking rod 161 is connected to a middle section of the second linking rod 162. Two ends of the second linking rod 162 are respectively connected to the two rear legs 40B.

Figure 9:
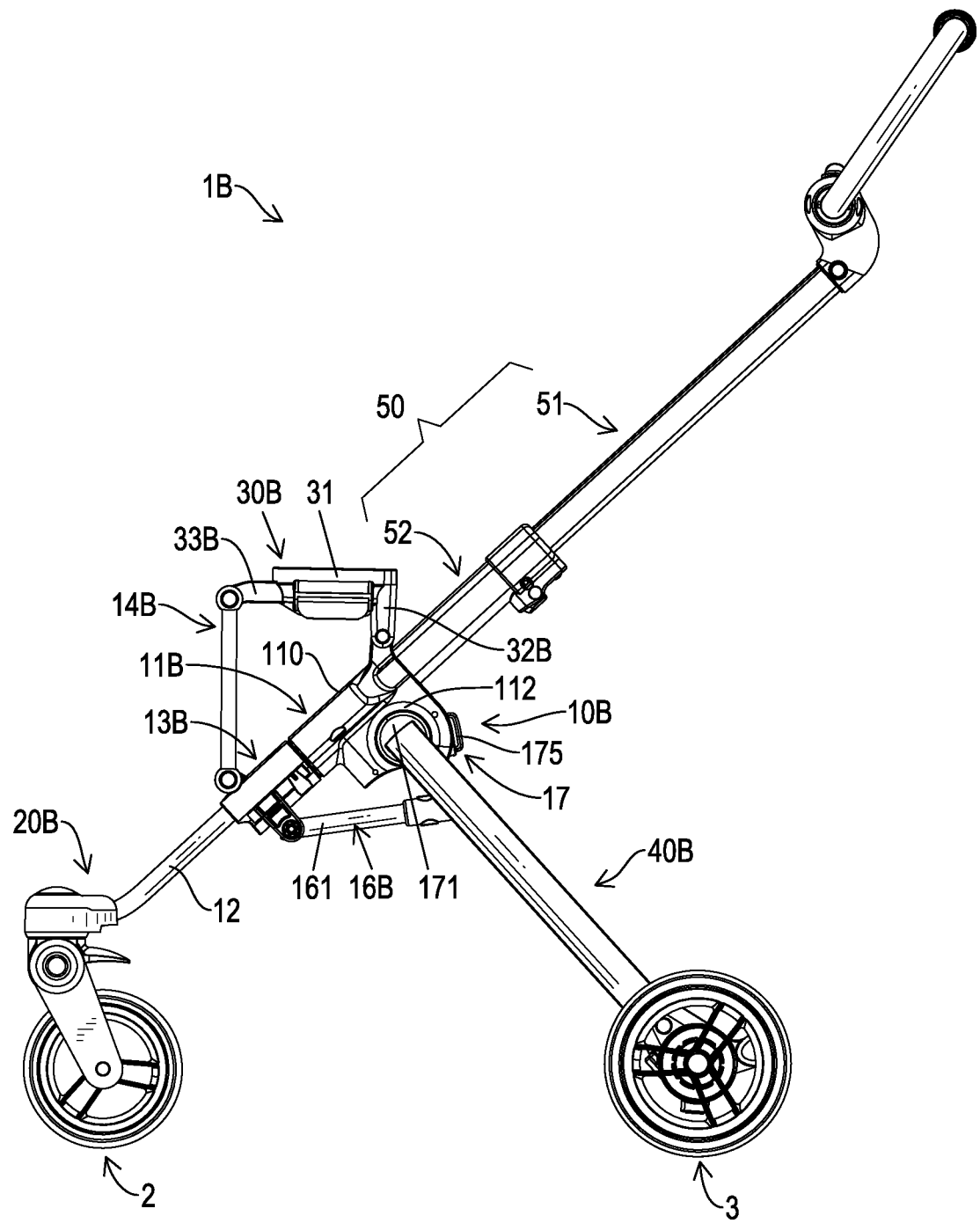
FIG. 9 is a side view of the foldable cart frame in FIGS. 7 and 8.

The connecting seat 30B is moveably disposed on the folding mechanism 10B, can be oscillated forwardly and backwardly, and has a body 31B and a rear supporting member 32B. The body 31B is disposed on the front supporting member 14B, and has the rear end and a front end. The front end of the body 31B is pivotally disposed on the front supporting member 14B located on the sliding seat 13B. With reference to FIGS. 7 and 9, the rear supporting member 32B is integratedly formed on the rear end of the body 31B. Alternatively, with reference to FIG. 10, a top end of the rear supporting member 32B is pivotally disposed on the rear end of the body 31B. The bottom end of the rear supporting member 32B is pivotally disposed on the base portion 110 of the base seat 11B. The connecting seat 30B can be supported and folded by the front supporting member 14B and the rear supporting member 32B.

Furthermore, the body 31B has a front arm 33B. The front arm 33B is disposed on the front end of the body 31B, protrudes forwardly, and is pivotally disposed on the top end of the front supporting member 14B. The length of the front supporting member 14B is longer than the length of the rear supporting member 32B. The top end of the front supporting member 14B and the top end of the rear supporting member 32B are located at the same or approximately the same level. The connecting seat 30B is substantially disposed in a horizontal state.

Figure 10:
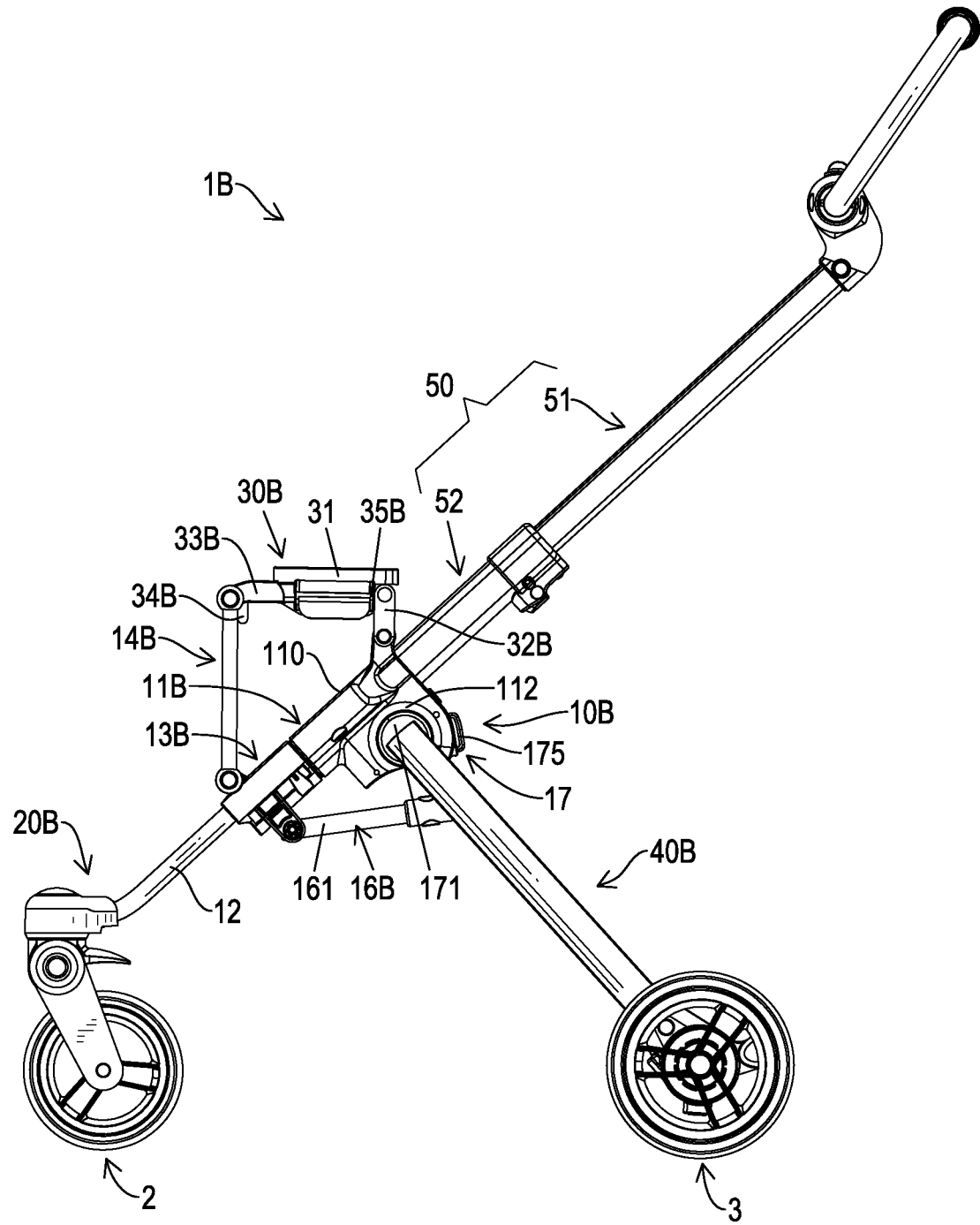
FIG. 10 is another side view of the foldable cart frame in FIG. 7, showing a body of a connecting seat of the foldable cart frame is pivotally connected to a rear supporting member.

With reference to FIG. 10, when a top end of the rear supporting member 32B of the connecting seat 30B is pivotally connected to the rear end of the body 31B, the body 31B has a front-bottom portion formed on the front end of the body 31B, a rear-bottom portion formed on the rear end of the body 31B, a front stopper 34B disposed on the front-bottom portion of the body 31B, and a rear stopper 35B disposed on the rear-bottom portion of the body 31B. In expanding, a top end of the front supporting member 14B is stopped by the front stopper 34B, and the top end of the rear supporting member 32B is stopped by the rear stopper 35B for positioning the connecting seat 30B steadily.

With reference to FIGS. 7 to 9, and 11, two top ends of the two rear legs 40B are directly and pivotally disposed on the two rear connecting portions 112, respectively. The two rear legs 40B are respectively connected to the two ends of the second linking rod 162 of the linkage assembly 16B. The two rear legs 40B can be oscillated forwardly and backwardly in a limited angle range. Two bottom ends of the two rear legs 40B are respectively connected to the two rear wheels 3.

Figure 8:
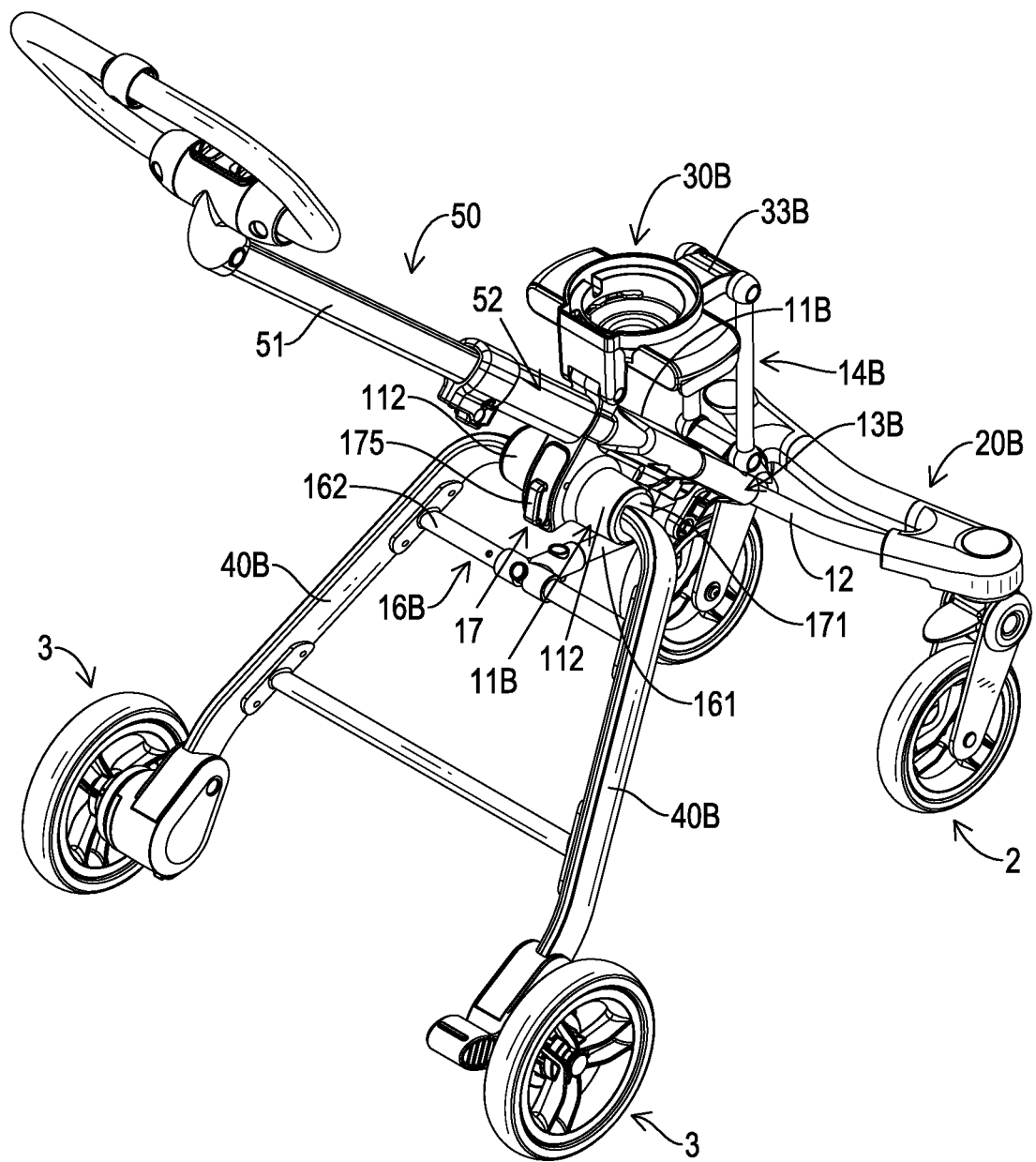
FIG. 8 is another perspective view of the foldable cart frame in FIG. 7.
Figure 11:
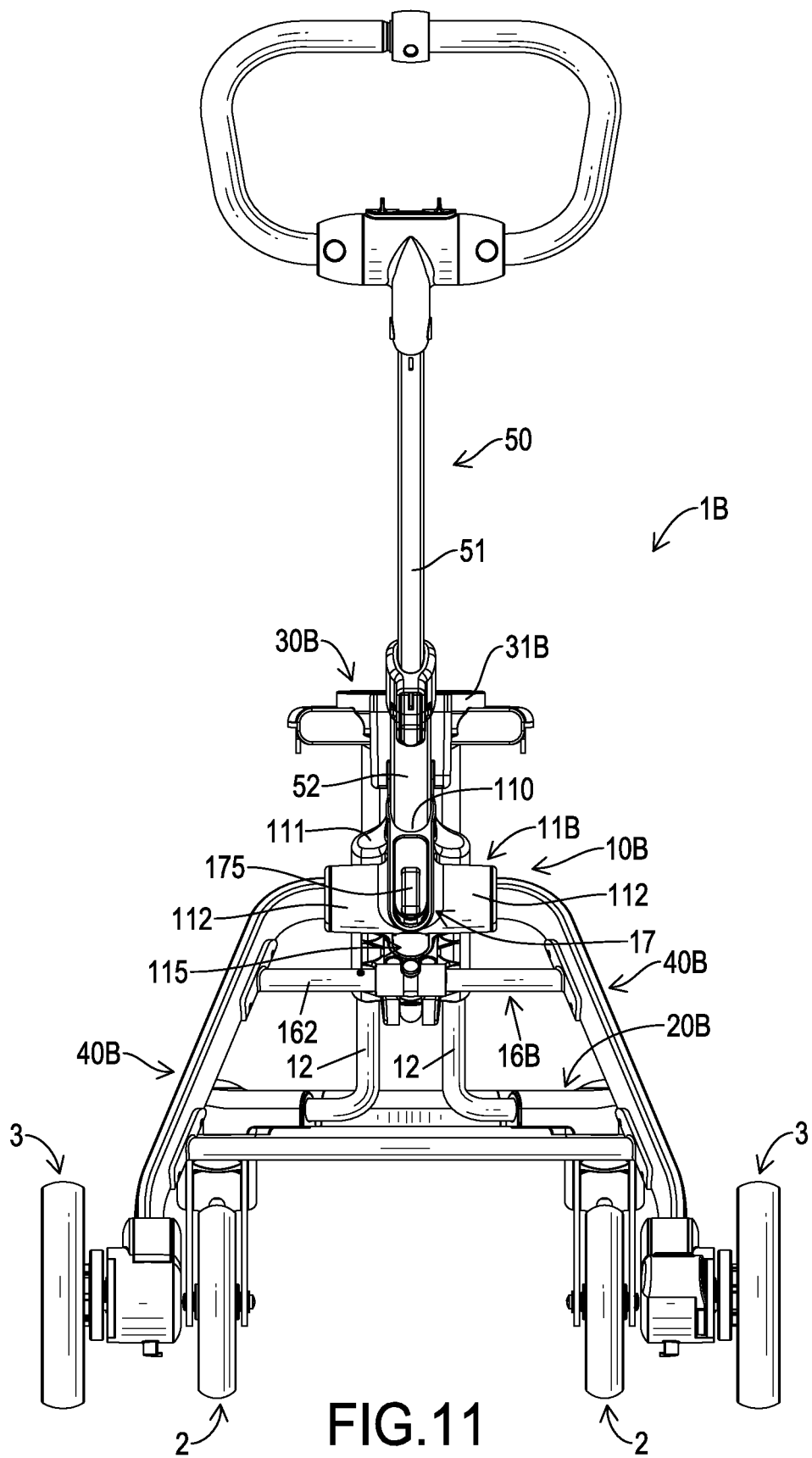
FIG. 11 is a rear side view of the foldable cart frame in FIGS. 7 and 8.
Figure 12:
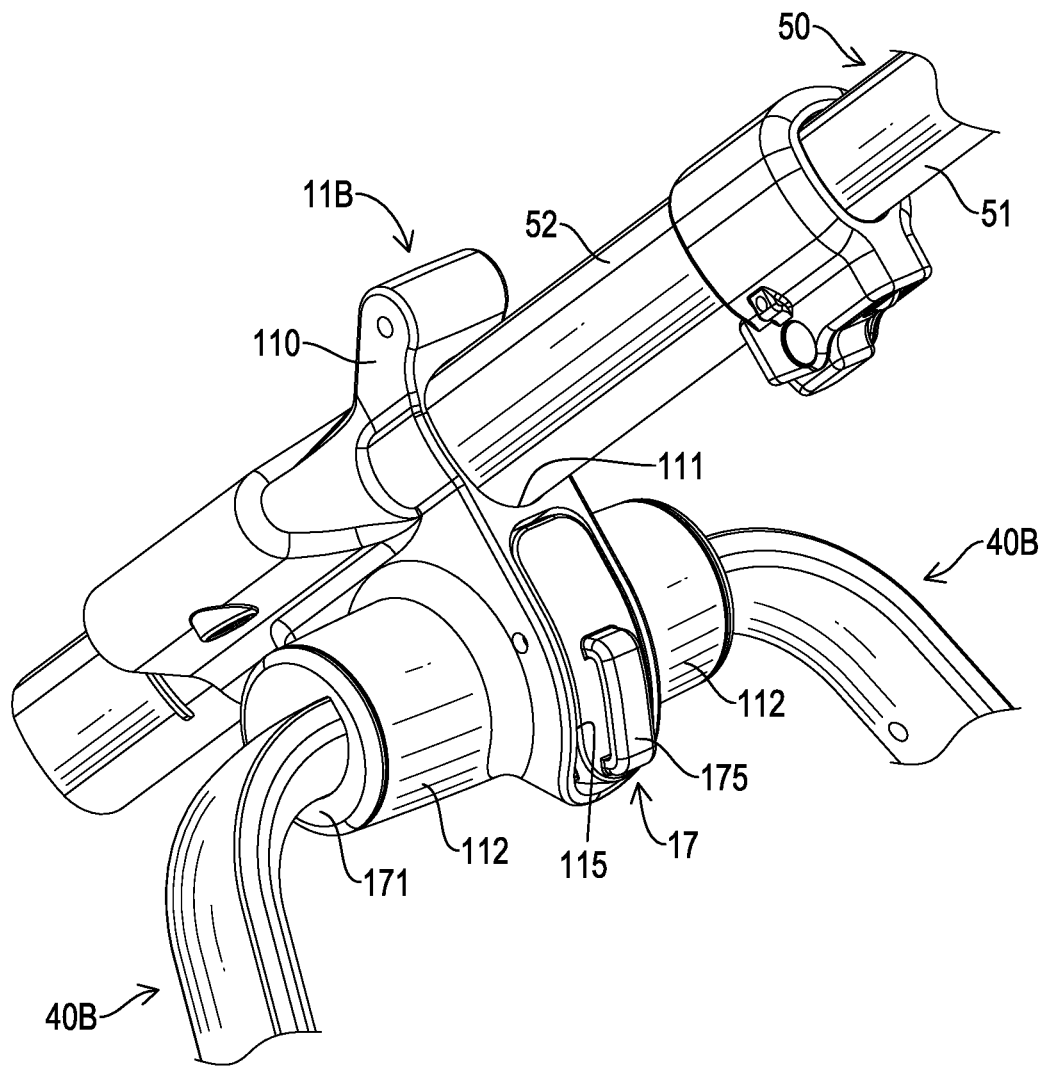
FIG. 12 is an enlarged perspective view of the foldable cart frame in FIGS. 7 to 9, and 11.
Figure 13:
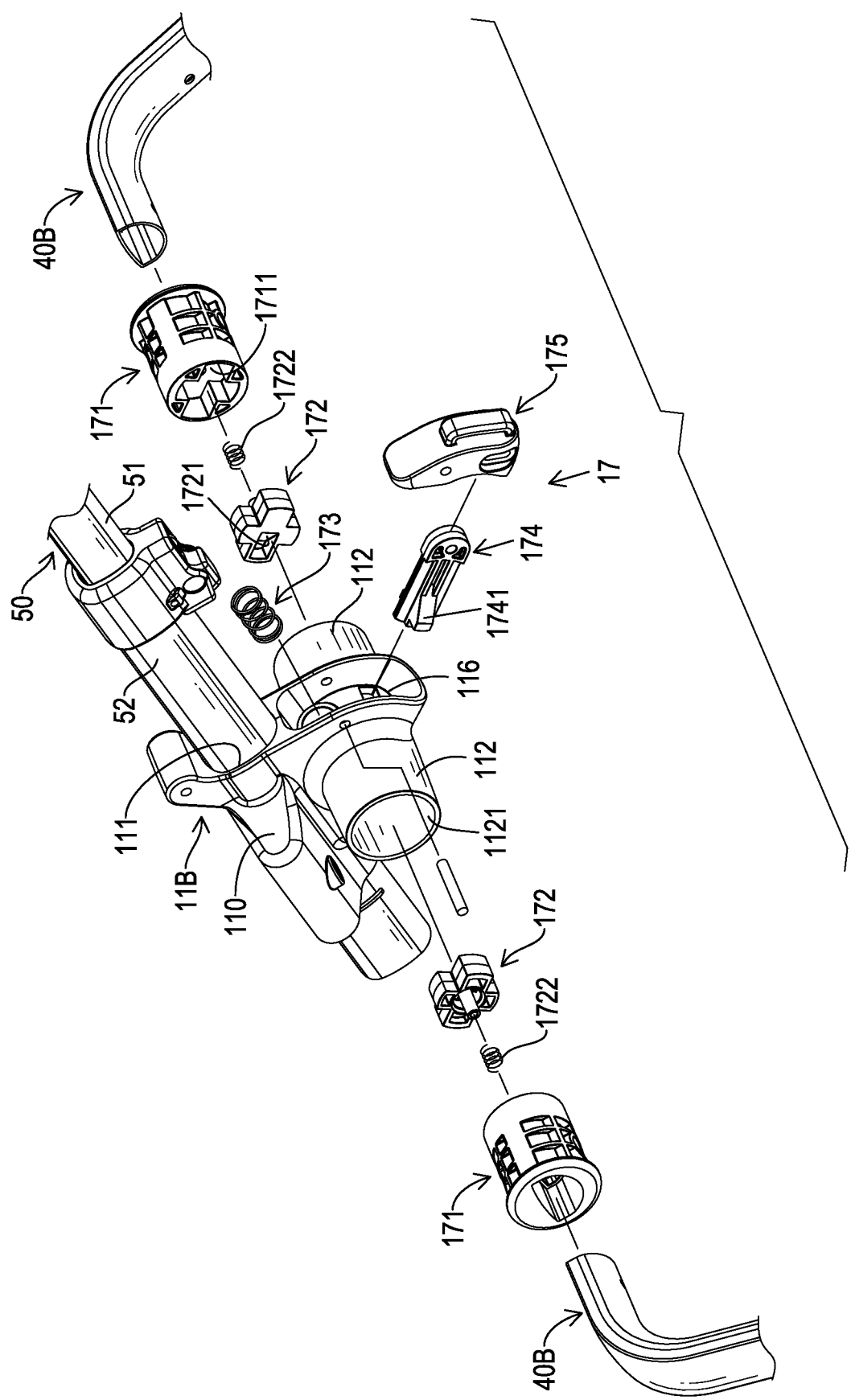
FIG. 13 is an enlarged and exploded perspective view of the foldable cart frame in FIG. 12.
Figure 14:
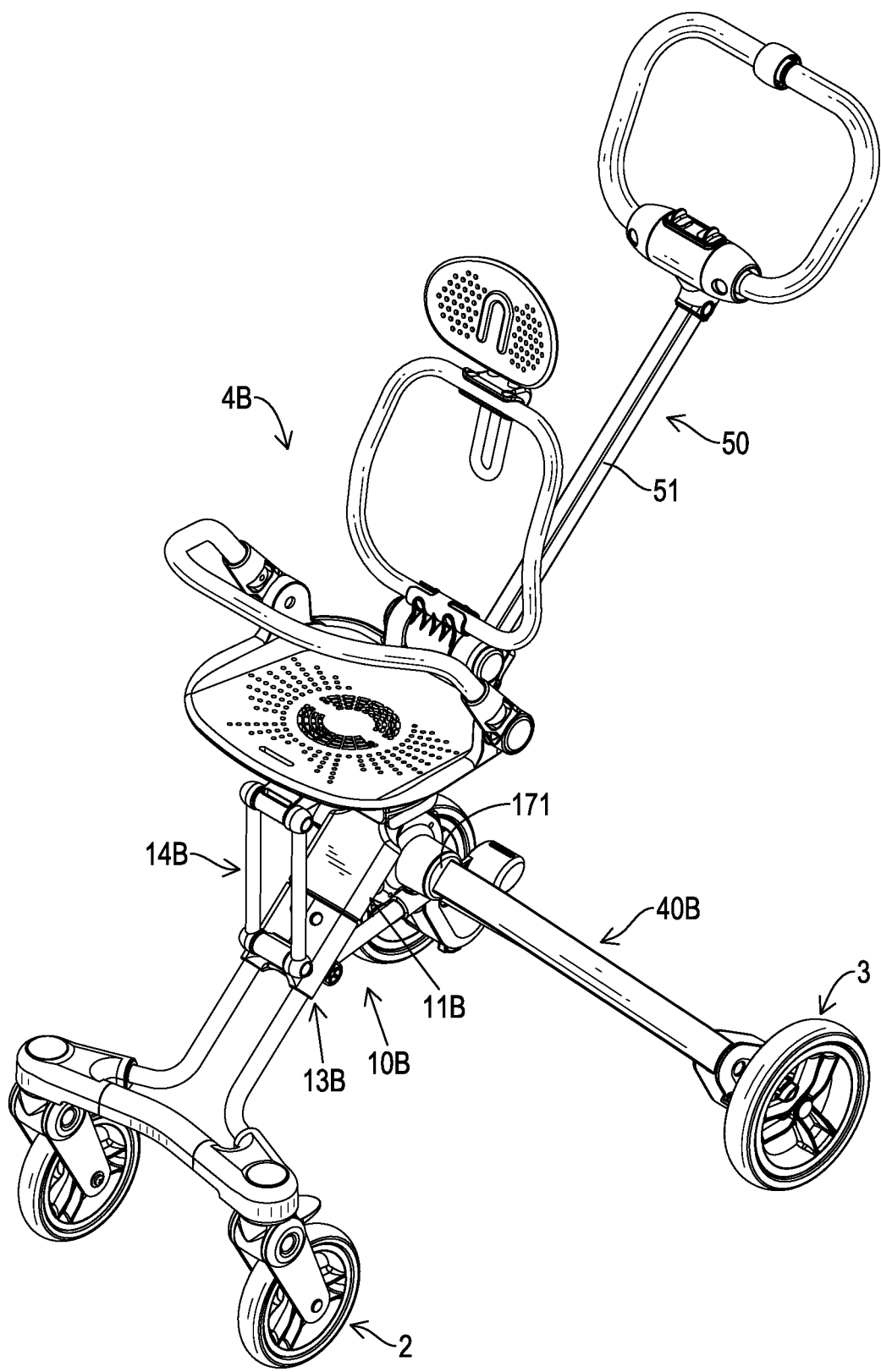
FIG. 14 is an operational perspective view of the foldable cart frame in FIG. 7, showing a child seat is mounted on a connecting seat.
Figure 15:
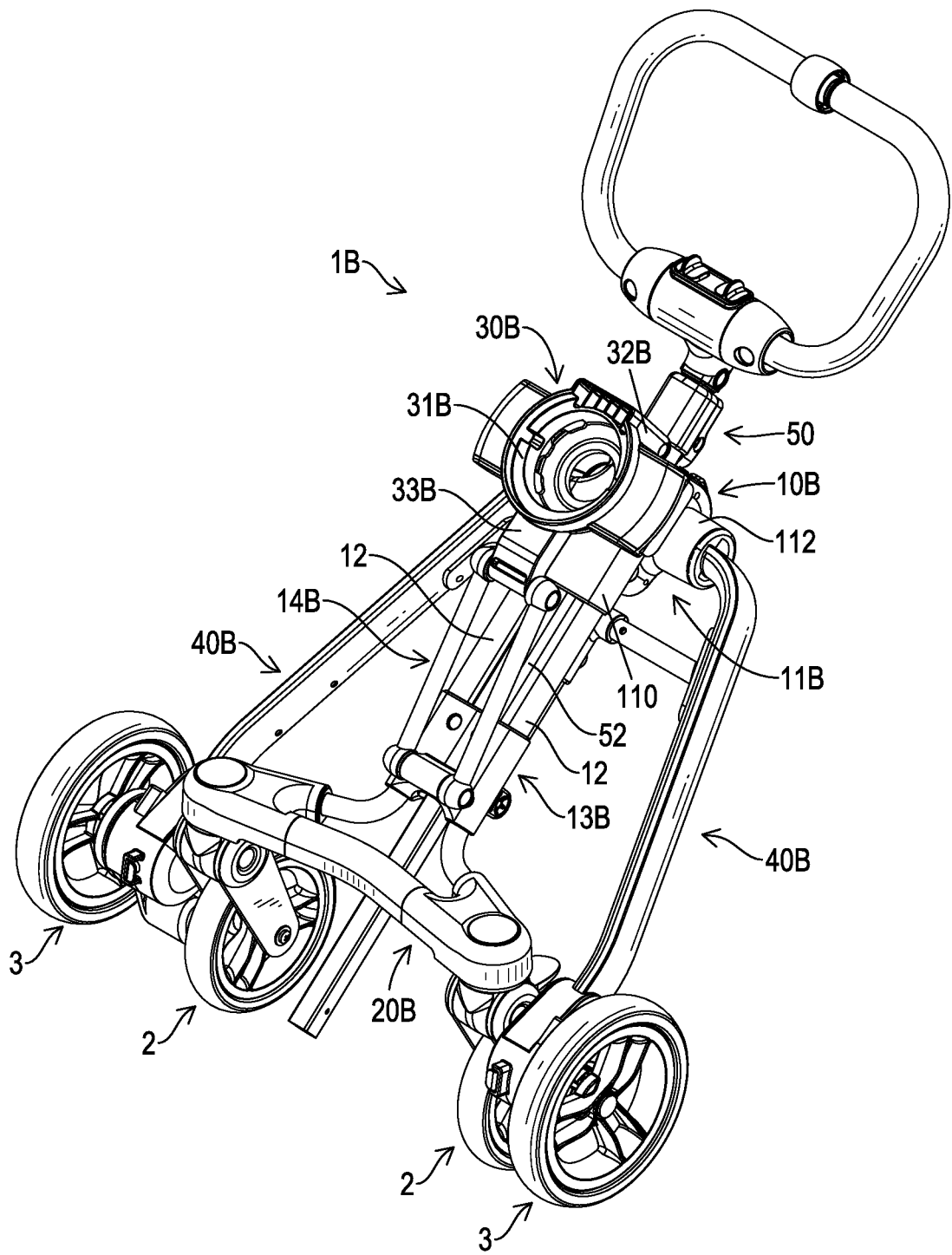
FIG. 15 is a folding perspective view of the foldable cart frame in FIGS. 7 to 9, and 11.
Figure 16:
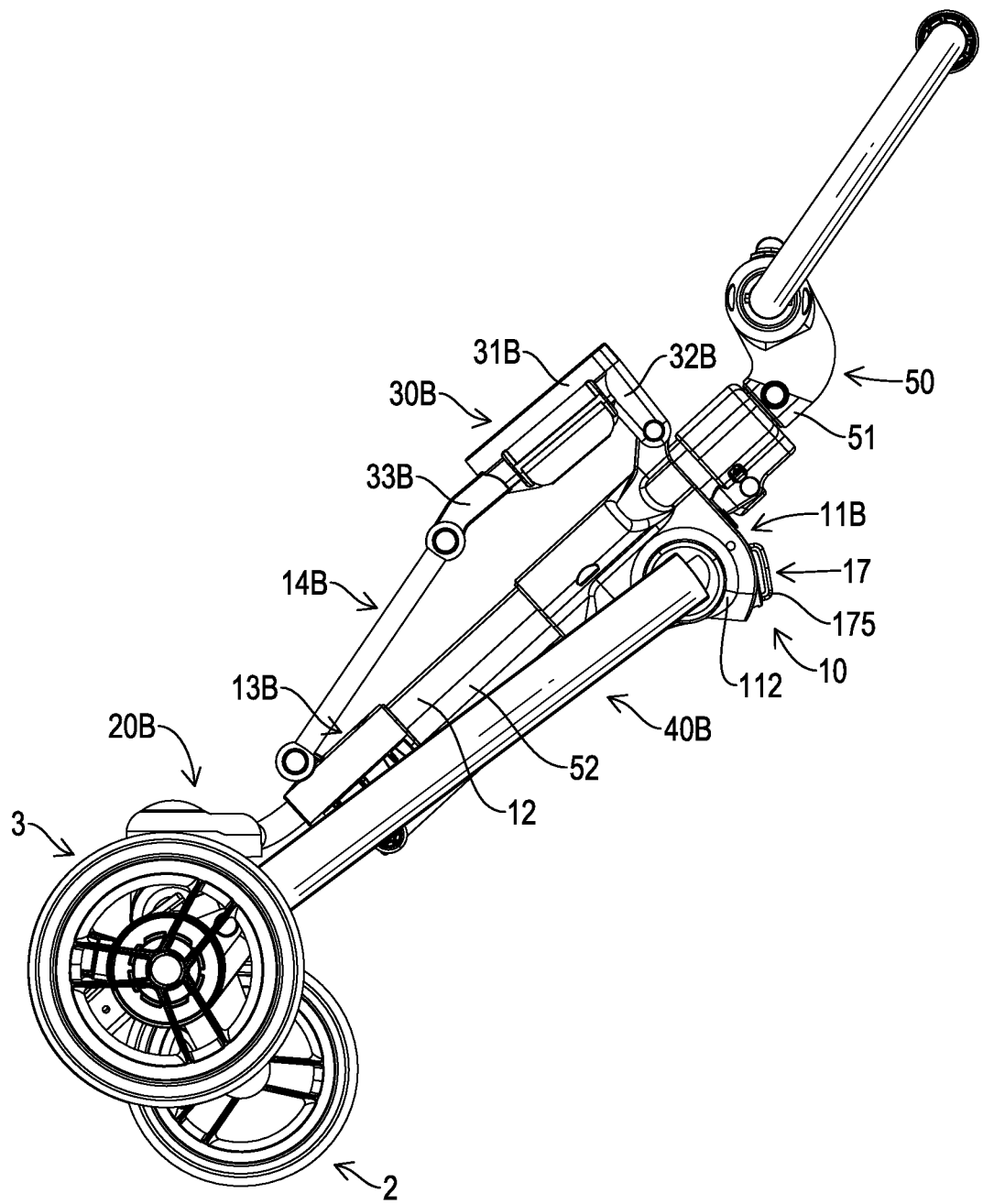
FIG. 16 is a folding side view of the foldable cart frame in FIGS. 7 to 9, and 11.

With reference to FIGS. 8, 11, and 13, the base seat 11B has a switch assembly 17 disposed on the base portion 110 of the base seat 11B. The two top ends of the two rear legs 40B are connected to the switch assembly 17 by the two connecting portions 112 of the base seat 11B. The two rear legs 40B can be rotated in the two rear connecting portions 112 and can be locked.

With reference to FIGS. 8, and 11 to 13, the base seat 11B has the back surface and the disposing hole 116. The disposing hole 116 is formed on the back surface of the base seat 11B and communicates with the two connecting holes 1121 of the two rear connecting portions 112. The switch assembly 17 has two leg connecting members 171, two locking blocks 172, two inner springs 1722, an unlocking member 174, an unlocking button 175, and a restoring spring 173.

The two leg connecting members 171 are respectively and rotatably disposed in the two connecting holes 1121 of the two rear connecting portions 112, are respectively connected to the two rear legs 40B, and have two inner end surfaces and two keyways 1711 respectively formed on the two inner end surfaces of the two leg connecting members 171.

The two locking blocks 172 are respectively disposed in the two keyways 1711 of the two leg connecting members 171, and have two unlocking inclined planes 1721 formed on the two locking blocks 172, respectively. The two locking blocks 172 are respectively clutched with the two keyways 1711.

The two inner springs 1722 are respectively disposed in the two keyways 1711 of the two leg connecting members 171 and are each connected with a respective one of the two locking blocks 172 and a respective one of the two leg connecting members 171.

The unlocking member 174 is disposed between the two locking blocks 172, and has two sides and two unlocking wedges 1741. The two unlocking wedges 1741 are respectively formed on the two sides of the unlocking member 174 and respectively abut against the two unlocking inclined planes 1721 of the two locking blocks 172.

The unlocking button 175 is disposed on the base seat 11B, is located in the disposing hole 116 of the base seat 11B, and is connected to the unlocking member 174 for driving the unlocking member 174.

The restoring spring 173 is disposed in the base seat 11B and is connected to the unlocking button 175. The two unlocking wedges 1741 of the unlocking member 174 respectively abut against the two unlocking inclined planes 1721 of the two locking blocks 172. The two leg connecting members 171 are locked or unlocked by the two locking blocks 172.

When the locking blocks 172 lock the two leg connecting members 171, the two leg connecting members 171 cannot be rotated in the two rear connecting portions 112 of the base seat 11B. When the locking blocks 172 unlock the two leg connecting members 171, the two leg connecting members 171 can be rotated in the two rear connecting portions 112 of the base seat 11B.

With reference to FIGS. 7 to 9, and 11, the handle unit 50 is movably inserted through the base portion 110 of the base seat 11B. The bottom end of the handle unit 50 is fixedly connected to the sliding seat 13B. The handle unit 50 is parallel with the at least one guiding rod 12, and can move upwardly and downwardly for driving the sliding seat 13B to slide. The handle unit 50 can be locked or unlocked in the base seat 11B by the locking element 115 disposed on the base seat 11B.

The handle unit 50 may be the member with the fixed length or the telescopic member capable of adjusting its length. With reference to FIGS. 7 to 10, in the second embodiment of the foldable cart frame 1B, the handle unit 50 has the movable rod 52 and the handle arm 51. The movable rod 52 is slidably inserted through the base portion 110 of the base seat 11B and has a bottom end fixedly connected to the sliding seat 13B. The handle arm 51 is inserted into the movable rod 52. The length of the handle unit 50 is adjustable by a relative movement between the handle arm 51 and the movable rod 52. The movable rod 52 and the handle arm 51 can be selectively locked by the elastic fastener or other fixing elements. The handle unit 50 is slidably inserted into the guiding hole 111 of the base portion 110 by the movable rod 52. The bottom end of the movable rod 52 is fixedly connected to the sliding seat 13B. The locking element 115 of the base seat 11B can be locked by the movable rod 52 of the handle unit 50 for stopping the movable rod 52 of the handle unit 50 to slide relative to the base seat 11B. Simultaneously, the sliding seat 13B is fixed on the at least one guiding rod 12 by the locked movable rod 52.

The second embodiment of the foldable cart frame 1B is not limited to children's carts or shopping carts. The at least one guiding rod 12 can be directly connected to the at least one front wheel 2. Alternatively, the at least one guiding rod 12 is indirectly connected to the at least one front wheels 2 by the front wheel seat 20B. The two rear legs 40B are respectively connected to the two rear wheels 3. The connecting seat 30B can be connected to a child seat or a shopping basket. With reference to FIG. 13, in the second embodiment of the foldable cart frame 1B, the connecting seat 30B is connected to a child seat 4B.

In expanding, with reference to FIGS. 7 to 9, and 11, the base seat 11B is fixed on the top end of the at least one guiding rod 12. The movable rod 52 of the handle unit 50 is locked in the base seat 11B by the locking element 115 of the base seat 11B. The sliding seat 13B connected on the bottom end of the movable rod 52 is relatively fixed on the at least one guiding rod 12. The sliding seat 13B is fixed. The front end of the connecting seat 30B is connected to the fixed sliding seat 13B by the front supporting member 14B. The rear end of the connecting seat 30B is connected to the fixed base seat 11B by the rear supporting member 32B. The connecting seat 30B, the front supporting member 14B, and the rear supporting member 32B are restrained by each other for fixing. The connecting seat 30B is connected with the rear supporting member 32B, the base seat 11B, the front supporting member 14B, the sliding seat 13B, and the guiding rod 12 to form the stable, substantially triangular supporting structure. With reference to FIG. 10, the top end of the rear supporting member 32B of the connecting seat 30B is pivotally disposed on the rear end of the body 31B. The top end of the front supporting member 14B can be stopped and limited by the front stopper 34B of the connecting seat 30B. The top end of the rear supporting member 32B can be stopped and limited by the rear stopper 35B for increasing the expanding stability of the foldable cart frame 1B.

Moreover, the combined structure is combined with the sliding seat 13B, the at least one guiding rod 12, the base seat 11B, the two rear legs 40B, and the linkage assembly 16B to form the stable, substantially triangular supporting structure. The base seat 11B disposed on the at least one guiding rod 12 is connected to the two rear legs 40B. The front end of the linkage assembly 16B is limited by the locked sliding seat 13B. The two rear legs 40B are restrained and fixed by the switch assembly 17 of the base seat 11B, thereby ensuring that the second embodiment of the foldable cart frame 1B has stable structure and safety in expanding.

In use, with reference to FIGS. 11 to 16, the base seat 11B has the switch assembly 17 for ensuring the using safety of the foldable cart frame 1B. The unlocking button 175 of the switch assembly 17 is pressed by the user to unlock the two rear legs 40B and the handle unit 50. The handle arm 51 of the handle unit 50 can be pulled upwardly by the user. The movable rod 52 disposed around the handle arm 51 is slid relative to the base seat 11B. The sliding seat 13B driven by the movable rod 52 is slid upwardly along the at least one guiding rod 12. The front supporting member 14B located above the sliding seat 13B upwardly pushes the connecting seat 30B to move. The linkage assembly 16B backwardly pushes the two rear legs 40B. The two rear legs 40B are expanded backwardly. When the foldable cart frame 1B is expanded completely, the movable rod 52 is locked and fixed on the base seat 11B by the locking element 115. The restoring spring 173 provides a restoring force to the unlocking button 175 for restoring. The two locking blocks 172 of the switch assembly 17 respectively re-engage with the two leg connecting members 171 for locking the two rear legs 40B and expanding the foldable cart frame 1B.

In folding, with reference to FIGS. 7 to 9, 15, and 16, a locking state between the movable rod 52 and the locking element 115 of the base seat 11B is released. A locking state between the two rear legs 40B and the switch assembly 17 is released, too. The movable rod 52 driven by the handle arm 51 of the handle unit 50 can be slid downwardly relative to the base seat 11B. The sliding seat 13B driven by the movable rod 52 can be slid downwardly relative to the at least one guiding rod 12. The stable, substantially triangular supporting structure formed by the connecting seat 30B, the rear supporting member 32B, the base seat 11B, the front supporting member 14B, the sliding seat 13B, and the at least one guiding rod 12 is released and changes to the foldable linkage mechanism. The connecting seat 30B is folded by the foldable linkage mechanism to move toward the at least one guiding rod 12. Simultaneously, the stable, substantially triangular supporting structure formed by the sliding seat 13B, the at least one guiding rod 12, the base seat 11B, the two rear legs 40B, and the linkage assembly 16B is released and changes to the foldable linkage mechanism. The two rear legs 40B can be pulled by the sliding seat 13B to closely fold toward the at least one guiding rod 12 and the front wheel seat 20B. The foldable cart frame 1B has effects of convenient and quick folding.

After folding, the two rear wheels 3 can be folded and move to the outsides of the two front wheels 2 for reducing the space occupied by the foldable cart frame 1B. The foldable cart frame 1B can be folded into a small volume for convenience to carry, use, convey, and store. When the foldable cart frame 1B is expanded, the two rear wheels 3 are located behind the two front wheels 2 for convenience to use.

Accordingly, the foldable cart frame 1A, 1B has the linkage mechanism composed of the folding mechanism 10A, 10B, the connecting seat 30A, 30B, the two rear legs 40A, 40B, and the handle unit 50. The base seat 11A, 11B is connected to the at least one guiding rod 12 in the folding mechanism 10A, 10B. The sliding seat 13A, 13B is slidably disposed on the at least one guiding rod 12. The two rear connecting portions 112 of the base seat 11A, 11B are respectively and pivotally disposed on the two rear legs 40A, 40B. The handle unit 50 is inserted through the base seat 11A, 11B and is connected to the sliding seat 13A, 13B.

The handle unit 50 can be locked by the locking element 115 in the base seat 11A, 11B. The sliding seat 13A, 13B is connected to the two rear legs 40A, 40B with the linkage assembly 16A, 16B, and is pivotally disposed on the front end of the front supporting member 14A, 14B. The rear end of the connecting seat 30A, 30B is connected to a rear supporting member 32A, 32B for pivoting the base seat 11A, 11B. The handle unit 50 can drive the sliding seat 13A, 13B and/or the connecting seat 30A, 30B to move. The two rear legs 40A, 40B are driven by the linkage assembly 16A, 16B. The folding operation and the expanding operation of the foldable cart frame 1A, 1B are convenient and quick. After the foldable cart frame 1A, 1B is expanded, the connecting seat 30A, 30B and its connecting components can form a stable supporting structure.

Furthermore, the foldable cart frame 1A, 1B has a pivoting connecting structure located between the base seat 11A, 11B of the folding mechanism 10A, 10B and the two rear legs 40A, 40B. In folding, the two rear legs 40A, 40B are folded toward and are relatively close to each other. Simultaneously, the two rear wheels 3 connected to the bottom ends of the two rear legs 40A, 40B can be located between the two front wheels 2 located at the front end of the foldable cart frame 1A, 1B, or the two front wheels 2 can be located between the two rear wheels 3. After folding, the foldable cart frame 1A, 1B can be folded into a small volume for convenience to carry, use, convey, and store.

What is claimed is:

1. A foldable cart frame comprising:
    a folding mechanism having
        a base seat having
            a base portion having two sides;
            two rear connecting portions respectively connected to and located at the two sides of the base portion; and
            a locking element disposed on the base portion;
        at least one guiding rod connected to the base portion of the base seat and inclined forwardly and downwardly, wherein the at least one guiding rod is used to connect at least one front wheel;
        a sliding seat disposed around the at least one guiding rod and being moveable along the at least one guiding rod;
        a front supporting member pivotally disposed on the sliding seat; and
        a linkage assembly moveably connected to the sliding seat;
    a connecting seat moveably disposed on the folding mechanism, and having
        a body disposed on the front supporting member, and having
            a rear end; and
            a front section of the body pivotally disposed on the front supporting member; and
        a rear supporting member disposed on the rear end of the body, inclined downwardly, and having a bottom end pivotally disposed on the base seat;
    two rear legs disposed on the base seat, connected to the linkage assembly, and having two top ends pivotally disposed on the two rear connecting portions of the base seat, wherein the two rear legs are connected to two rear wheels, and the two rear legs are linked between the sliding seat and the linkage assembly for folding forward and expanding backward; and
    a handle unit moveably inserted through the base portion of the base seat, being parallel with the at least one guiding rod, and fixedly connected to the sliding seat, wherein the sliding seat and the connecting seat are driven by the handle unit for moving, and the locking element is able to lock the handle unit in the base seat.

2. The foldable cart frame as claimed in claim 1, wherein the rear supporting member of the connecting seat is integratedly formed on the rear end of the body.

3. The foldable cart frame as claimed in claim 2, wherein the amount of the at least one guiding rod is two, the two guiding rods are parallel with each other and are both connected to the base seat, front ends of the two guiding rods are co-connected to a front wheel seat of the foldable cart frame, and the front wheel seat is connected to the at least one front wheel.

4. The foldable cart frame as claimed in claim 2, wherein
    the two rear connecting portions of the base seat extend from the two sides of the base portion and extend rearward, downward, and outward, each one of the two rear connecting portions has a guiding connecting groove, and the guiding connecting groove has an opening formed on the rear connecting portion and is inclined forwardly and downwardly;
    the two top ends of the two rear legs are respectively and pivotally disposed on the two rear connecting portions and are respectively inserted into the two guiding connecting grooves of the two rear connecting portions; and
    wherein in folding, the two rear legs are guided by the two guiding connecting grooves, the two rear legs are folded toward each other, and the two rear legs are relatively close to each other.

5. The foldable cart frame as claimed in claim 2, wherein the handle unit has
    a movable rod slidably inserted through the base portion of the base seat, and having
        a bottom end fixedly connected to the sliding seat; and
    a handle arm inserted into the movable rod;
    wherein a length of the handle unit is adjustable by a relative movement between the handle arm and the movable rod, and the locking element of the base seat is able to selectively lock the movable rod.

6. The foldable cart frame as claimed in claim 2, wherein the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

7. The foldable cart frame as claimed in claim 2, wherein
the two rear connecting portions of the base seat extend from the two sides of the base portion and extend rearward, downward, and outward, each one of the two rear connecting portions has a guiding connecting groove, and the guiding connecting groove has an opening formed on the rear connecting portion and inclined forwardly and downwardly;
the two top ends of the two rear legs are respectively and pivotally disposed on the two rear connecting portions and are respectively inserted into the two guiding connecting grooves of the two rear connecting portions;
wherein in folding, the two rear legs are guided by the two guiding connecting grooves, the two rear legs are folded toward each other, and the two rear legs are relatively close to each other; and
the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

8. The foldable cart frame as claimed in claim 2, wherein the amount of the at least one guiding rod is two, the two guiding rods are parallel with each other and are both connected to the base seat, front ends of the two guiding rods are co-connected to a front wheel seat of the foldable cart frame, and the front wheel seat is connected to the at least one front wheel;
the two rear connecting portions of the base seat extend from the two sides of the base portion and extend rearward, downward, and outward, each one of the two rear connecting portions has a guiding connecting groove, and the guiding connecting groove has an opening formed on the rear connecting portion and inclined forwardly and downwardly;
the two top ends of the two rear legs are respectively and pivotally disposed on the two rear connecting portions and are respectively inserted into the two guiding connecting grooves of the two rear connecting portions;
wherein in folding, the two rear legs are guided by the two guiding connecting grooves, the two rear legs are folded toward each other, and the two rear legs are relatively close to each other;
the handle unit has a movable rod and a handle arm, the movable rod is slidably inserted through the base portion of the base seat and has a bottom end fixedly connected to the sliding seat, and the handle arm is inserted into the movable rod;
wherein a length of the handle unit is adjustable by a relative movement between the handle arm and the movable rod, and the locking element of the base seat is able to selectively lock the movable rod; and
the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

9. The foldable cart frame as claimed in claim 2, wherein the two rear connecting portions have two connecting holes, and the two connecting holes are formed on the two rear connecting portions and are axially opposite to each other; and
the base seat has
a back surface;
a disposing hole formed on the back surface of the base seat and communicating with the two connecting holes of the two rear connecting portions;
a switch assembly disposed on the base portion for locking or unlocking the two rear legs, and having
two leg connecting members respectively and rotatably disposed in the two connecting holes of the two rear connecting portions, respectively connected to the two rear legs, and having two inner end surfaces and two keyways respectively formed on the two inner end surfaces of the two leg connecting members;
two locking blocks respectively disposed in the two keyways of the two leg connecting members, and having two unlocking inclined planes formed on the two locking blocks, respectively, wherein the two locking blocks are respectively clutched with the two keyways;
two inner springs respectively disposed in the two keyways of the two leg connecting members and each connected with a respective one of the two locking blocks and a respective one of the two leg connecting members;
an unlocking member disposed between the two locking blocks, and having
two sides; and
two unlocking wedges formed on the two sides of the unlocking member and respectively abutting against the two unlocking inclined planes of the two locking blocks;
an unlocking button disposed on the base seat, located in the disposing hole of the base seat, and connected to the unlocking member for driving the unlocking member; and
a restoring spring disposed in the base seat and connected to the unlocking button, wherein the two unlocking wedges of the unlocking member abut against the two unlocking inclined planes of the two locking blocks, and the two leg connecting members are locked or unlocked by the two locking blocks.

10. The foldable cart frame as claimed in claim 1, wherein the rear supporting member of the connecting seat has a top end pivotally connected to the rear end of the body;
the body has
a front end;
a front-bottom portion formed on the front end of the body;
a rear-bottom portion formed on the rear end of the body;
a front stopper disposed on the front-bottom portion of the body; and
a rear stopper disposed on the rear-bottom portion of the body; and
in expanding, a top end of the front supporting member is stopped by the front stopper, and the top end of the rear supporting member is stopped by the rear stopper.

11. The foldable cart frame as claimed in claim 10, wherein the amount of the at least one guiding rod is two, the two guiding rods are parallel with each other and are both connected to the base seat, front ends of the two guiding rods are co-connected to a front wheel seat of the foldable cart frame, and the front wheel seat is connected to the at least one front wheel.

12. The foldable cart frame as claimed in claim 10, wherein
- the two rear connecting portions of the base seat extend from the two sides of the base portion and extend rearward, downward, and outward, each one of the two rear connecting portions has a guiding connecting groove, and the guiding connecting groove has an opening formed on the rear connecting portion and is inclined forwardly and downwardly;
- the two top ends of the two rear legs are respectively and pivotally disposed on the two rear connecting portions and are respectively inserted into the two guiding connecting grooves of the two rear connecting portions; and
- wherein in folding, the two rear legs are guided by the two guiding connecting grooves, the two rear legs are folded toward each other, and the two rear legs are relatively close to each other.

13. The foldable cart frame as claimed in claim 10, wherein the handle unit has
- a movable rod slidably inserted through the base portion of the base seat, and having
  - a bottom end fixedly connected to the sliding seat; and
- a handle arm inserted into the movable rod;
- wherein a length of the handle unit is adjustable by a relative movement between the handle arm and the movable rod, and the locking element of the base seat is able to selectively lock the movable rod.

14. The foldable cart frame as claimed in claim 1, wherein the amount of the at least one guiding rod is two, the two guiding rods are parallel with each other and are both connected to the base seat, front ends of the two guiding rods are co-connected to a front wheel seat of the foldable cart frame, and the front wheel seat is connected to the at least one front wheel.

15. The foldable cart frame as claimed in claim 1, wherein
- the two rear connecting portions of the base seat extend from the two sides of the base portion and extend rearward, downward, and outward, each one of the two rear connecting portions has a guiding connecting groove, and the guiding connecting groove has an opening formed on the rear connecting portion and is inclined forwardly and downwardly;
- the two top ends of the two rear legs are respectively and pivotally disposed on the two rear connecting portions and are respectively inserted into the two guiding connecting grooves of the two rear connecting portions; and
- wherein in folding, the two rear legs are guided by the two guiding connecting grooves, the two rear legs are folded toward each other, and the two rear legs are relatively close to each other.

16. The foldable cart frame as claimed in claim 1, wherein the handle unit has
- a movable rod slidably inserted through the base portion of the base seat, and having
  - a bottom end fixedly connected to the sliding seat; and
- a handle arm inserted into the movable rod;
- wherein a length of the handle unit is adjustable by a relative movement between the handle arm and the movable rod, and the locking element of the base seat is able to selectively lock the moveable rod.

17. The foldable cart frame as claimed in claim 1, wherein the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

18. The foldable cart frame as claimed in claim 1, wherein
- the two rear connecting portions of the base seat extend from the two sides of the base portion and extend rearward, downward, and outward, each one of the two rear connecting portions has a guiding connecting groove, and the guiding connecting groove has an opening formed on the rear connecting portion and inclined forwardly and downwardly;
- the two top ends of the two rear legs are respectively and pivotally disposed on the two rear connecting portions and are respectively inserted into the two guiding connecting grooves of the two rear connecting portions;
- wherein in folding, the two rear legs are guided by the two guiding connecting grooves, the two rear legs are folded toward each other, and the two rear legs are relatively close to each other; and
- the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

19. The foldable cart frame as claimed in claim 1, wherein
- the amount of the at least one guiding rod is two, the two guiding rods are parallel with each other and are both connected to the base seat, front ends of the two guiding rods are co-connected to a front wheel seat of the foldable cart frame, and the front wheel seat is connected to the at least one front wheel;
- the two rear connecting portions of the base seat extend from the two sides of the base portion and extend rearward, downward, and outward, each one of the two rear connecting portions has a guiding connecting groove, and the guiding connecting groove has an opening formed on the rear connecting portion and inclined forwardly and downwardly;
- the two top ends of the two rear legs are respectively and pivotally disposed on the two rear connecting portions and are respectively inserted into the two guiding connecting grooves of the two rear connecting portions;
- wherein in folding, the two rear legs are guided by the two guiding connecting grooves, the two rear legs are folded toward each other, and the two rear legs are relatively close to each other;
- the handle unit has a movable rod and a handle arm, the movable rod is slidably inserted through the base portion of the base seat and has a bottom end fixedly connected to the sliding seat, and the handle arm is inserted into the movable rod;
- wherein a length of the handle unit is adjustable by a relative movement between the handle arm and the movable rod, and the locking element of the base seat is able to selectively lock the movable rod; and
- the linkage assembly has two linking rods, each one of the two linking rods is connected with the sliding seat and a corresponding one of the two rear legs, one end of each one of the two linking rods is pivotally disposed on the sliding seat, and the other end of each one of the two linking rods is pivotally disposed on the corresponding one of the two rear legs.

20. The foldable cart frame as claimed in claim 1, wherein the two rear connecting portions have two connecting holes, and the two connecting holes are formed on the two rear connecting portions and are axially opposite to each other; and the base seat has
- a back surface;
- a disposing hole formed on the back surface of the base seat and communicating with the two connecting holes of the two rear connecting portions;
- a switch assembly disposed on the base portion for locking or unlocking the two rear legs, and having
  - two leg connecting members respectively and rotatably disposed in the two connecting holes of the two rear connecting portions, respectively connected to the two rear legs, and having two inner end surfaces and two keyways respectively formed on the two inner end surfaces of the two leg connecting members;
  - two locking blocks respectively disposed in the two keyways of the two leg connecting members, and having two unlocking inclined planes formed on the two locking blocks, respectively, wherein the two locking blocks are respectively clutched with the two keyways;
  - two inner springs respectively disposed in the two keyways of the two leg connecting members and each connected with a respective one of the two locking blocks and a respective one of the two leg connecting members;
  - an unlocking member disposed between the two locking blocks, and having
    - two sides; and
    - two unlocking wedges formed on the two sides of the unlocking member and respectively abutting against the two unlocking inclined planes of the two locking blocks;
  - an unlocking button disposed on the base seat, located in the disposing hole of the base seat, and connected to the unlocking member for driving the unlocking member; and
  - a restoring spring disposed in the base seat and connected to the unlocking button, wherein the two unlocking wedges of the unlocking member abut against the two unlocking inclined planes of the two locking blocks, and the two leg connecting members are locked or unlocked by the two locking blocks.

* * * * *